United States Patent
Sullivan

(10) Patent No.: US 8,493,513 B2
(45) Date of Patent: Jul. 23, 2013

(54) RESAMPLING AND PICTURE RESIZING OPERATIONS FOR MULTI-RESOLUTION VIDEO CODING AND DECODING

(75) Inventor: Gary J. Sullivan, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 13/102,943

(22) Filed: May 6, 2011

(65) Prior Publication Data

US 2011/0211122 A1 Sep. 1, 2011

Related U.S. Application Data

(63) Continuation of application No. 11/650,531, filed on Jan. 5, 2007, now Pat. No. 7,956,930.

(60) Provisional application No. 60/756,846, filed on Jan. 6, 2006, provisional application No. 60/786,573, filed on Mar. 27, 2006, provisional application No. 60/829,515, filed on Oct. 13, 2006.

(51) Int. Cl.
*H04N 9/74* (2006.01)

(52) U.S. Cl.
USPC ............................ 348/581; 348/443; 348/458

(58) Field of Classification Search
USPC .................. 348/581, 441, 443, 445–446, 448, 348/458–459, 714–721, 413, 415–416, 401, 348/402, 409, 410; 345/660–670, 555, 560; 382/298, 307, 297; 358/451, 426.26, 240.26, 358/240.29
IPC ........................................................ H04N 9/74
See application file for complete search history.

(56) References Cited

U.S. PATENT DOCUMENTS

| | | | |
|---|---|---|---|
| 5,136,377 A | 8/1992 | Johnston et al. | |
| 5,300,949 A | 4/1994 | Rodriquez et al. | |

(Continued)

FOREIGN PATENT DOCUMENTS

| | | |
|---|---|---|
| CN | 1378384 | 11/2002 |
| CN | 1722838 | 1/2006 |

(Continued)

OTHER PUBLICATIONS

Andreopoulos et al., "A New Method for Complete-to-Overcomplete Discrete Wavelet Transforms," *Proc. IEEE Conf. Digital Signal Proc.*, 4 pp. (Jul. 2002).

(Continued)

*Primary Examiner* — Trang U Tran
(74) *Attorney, Agent, or Firm* — Klarquist Sparkman, LLP

(57) ABSTRACT

Techniques and tools for high accuracy position calculation for picture resizing in applications such as spatially-scalable video coding and decoding are described. In one aspect, resampling of a video picture is performed according to a resampling scale factor. The resampling comprises computation of a sample value at a position i, j in a resampled array. The computation includes computing a derived horizontal or vertical sub-sample position x or y in a manner that involves approximating a value in part by multiplying a $2^n$ value by an inverse (approximate or exact) of the upsampling scale factor. The approximating can be a rounding or some other kind of approximating, such as a ceiling or floor function that approximates to a nearby integer. The sample value is interpolated using a filter.

29 Claims, 12 Drawing Sheets

U.S. PATENT DOCUMENTS

| | | | |
|---|---|---|---|
| 5,414,469 A | 5/1995 | Gonzales et al. | |
| 5,565,920 A * | 10/1996 | Lee et al. | 375/240.11 |
| 5,611,038 A | 3/1997 | Shaw et al. | |
| 5,764,296 A | 6/1998 | Shin | |
| RE35,910 E | 9/1998 | Nagata et al. | |
| 5,821,986 A * | 10/1998 | Yuan et al. | 348/14.12 |
| 5,828,421 A | 10/1998 | Boyce et al. | |
| 5,864,637 A | 1/1999 | Liu et al. | |
| 5,970,173 A | 10/1999 | Lee et al. | |
| 6,002,801 A | 12/1999 | Strongin et al. | |
| 6,014,694 A | 1/2000 | Aharoni et al. | |
| 6,104,434 A * | 8/2000 | Nakagawa et al. | 375/240.16 |
| 6,157,396 A * | 12/2000 | Margulis et al. | 345/506 |
| 6,229,570 B1 | 5/2001 | Bugwadia et al. | |
| 6,239,847 B1 * | 5/2001 | Deierling | 348/581 |
| 6,259,741 B1 | 7/2001 | Chen et al. | |
| 6,324,301 B1 | 11/2001 | Jacquin et al. | |
| 6,339,434 B1 | 1/2002 | West et al. | |
| 6,418,166 B1 | 7/2002 | Wu et al. | |
| 6,456,663 B1 | 9/2002 | Kim | |
| 6,499,060 B1 | 12/2002 | Wang et al. | |
| 6,501,484 B1 | 12/2002 | Porter | |
| 6,510,177 B1 | 1/2003 | De Bonet et al. | |
| 6,529,631 B1 | 3/2003 | Peterson et al. | |
| 6,535,555 B1 | 3/2003 | Bordes et al. | |
| 6,600,785 B1 | 7/2003 | Nishigori et al. | |
| 6,678,424 B1 | 1/2004 | Ferguson | |
| 6,700,933 B1 | 3/2004 | Wu et al. | |
| 6,728,317 B1 | 4/2004 | Demos | |
| 6,823,014 B2 | 11/2004 | Kim | |
| 6,873,368 B1 | 3/2005 | Yu et al. | |
| 6,937,291 B1 | 8/2005 | Gryskiewicz | |
| 6,992,725 B2 | 1/2006 | Mohsenian | |
| 6,993,078 B2 | 1/2006 | Hall et al. | |
| 7,010,037 B2 | 3/2006 | Ye et al. | |
| 7,039,115 B1 | 5/2006 | Wu et al. | |
| 7,154,952 B2 | 12/2006 | Tourapis et al. | |
| 7,200,275 B2 | 4/2007 | Srinivasan et al. | |
| 7,233,362 B2 | 6/2007 | Wu | |
| 7,236,526 B1 | 6/2007 | Kitamura | |
| 7,317,759 B1 | 1/2008 | Turaga et al. | |
| 7,375,767 B2 | 5/2008 | Lee et al. | |
| 7,379,496 B2 | 5/2008 | Holcomb et al. | |
| 7,653,133 B2 | 1/2010 | Woods et al. | |
| 7,747,094 B2 | 6/2010 | Sekiguchi et al. | |
| 7,756,350 B2 | 7/2010 | Vos et al. | |
| 7,822,123 B2 | 10/2010 | Lin et al. | |
| 7,839,933 B2 | 11/2010 | Srinivasan et al. | |
| 7,956,930 B2 * | 6/2011 | Sullivan | 348/581 |
| 2002/0037047 A1 | 3/2002 | Van Der Schaar et al. | |
| 2002/0064226 A1 | 5/2002 | Bauer et al. | |
| 2002/0159484 A1 | 10/2002 | Azizoglu et al. | |
| 2002/0181583 A1 | 12/2002 | Corbera | |
| 2002/0181586 A1 | 12/2002 | Kondo et al. | |
| 2002/0186890 A1 | 12/2002 | Lee et al. | |
| 2002/0186894 A1 | 12/2002 | Ferguson | |
| 2003/0026339 A1 | 2/2003 | Presquet-Popescu et al. | |
| 2003/0099298 A1 | 5/2003 | Rose et al. | |
| 2003/0133500 A1 | 7/2003 | Auwera et al. | |
| 2003/0161401 A1 | 8/2003 | Shen et al. | |
| 2003/0185306 A1 | 10/2003 | MacInnis et al. | |
| 2004/0013195 A1 | 1/2004 | Panusopone et al. | |
| 2004/0042549 A1 | 3/2004 | Huang et al. | |
| 2004/0062307 A1 | 4/2004 | Hallapuro et al. | |
| 2004/0091174 A1 | 5/2004 | Wang et al. | |
| 2004/0101058 A1 | 5/2004 | Sasai et al. | |
| 2004/0161035 A1 | 8/2004 | Wedi | |
| 2004/0208247 A1 | 10/2004 | Barrau et al. | |
| 2004/0213345 A1 | 10/2004 | Holcomb et al. | |
| 2004/0264567 A1 | 12/2004 | Xu et al. | |
| 2005/0018771 A1 | 1/2005 | Bourge et al. | |
| 2005/0105611 A1 | 5/2005 | Bjontegaard | |
| 2005/0105617 A1 | 5/2005 | Chono | |
| 2005/0157791 A1 | 7/2005 | Sun | |
| 2005/0190867 A1 | 9/2005 | Sobchak et al. | |
| 2005/0195896 A1 | 9/2005 | Huang et al. | |
| 2005/0195900 A1 | 9/2005 | Han | |
| 2005/0196073 A1 | 9/2005 | MacInnis et al. | |
| 2005/0207496 A1 | 9/2005 | Komiya et al. | |
| 2005/0259729 A1 | 11/2005 | Sun | |
| 2005/0281333 A1 | 12/2005 | Ghanbari | |
| 2006/0008006 A1 | 1/2006 | Cha et al. | |
| 2006/0013305 A1 | 1/2006 | Sun | |
| 2006/0072672 A1 | 4/2006 | Lin et al. | |
| 2006/0072673 A1 | 4/2006 | Lin et al. | |
| 2006/0083308 A1 | 4/2006 | Schwarz et al. | |
| 2006/0093036 A1 | 5/2006 | Park et al. | |
| 2006/0104349 A1 | 5/2006 | Joch et al. | |
| 2006/0120614 A1 | 6/2006 | Flierl et al. | |
| 2006/0133485 A1 | 6/2006 | Park et al. | |
| 2006/0133503 A1 | 6/2006 | Park et al. | |
| 2006/0146937 A1 | 7/2006 | Ye et al. | |
| 2006/0153465 A1 | 7/2006 | Zhang et al. | |
| 2006/0159173 A1 | 7/2006 | Ye et al. | |
| 2006/0165302 A1 | 7/2006 | Han et al. | |
| 2006/0193388 A1 | 8/2006 | Woods et al. | |
| 2006/0210185 A1 | 9/2006 | Sun | |
| 2006/0222083 A1 | 10/2006 | Klein et al. | |
| 2006/0262985 A1 | 11/2006 | Chen et al. | |
| 2006/0268991 A1 | 11/2006 | Segall et al. | |
| 2006/0285594 A1 | 12/2006 | Kim et al. | |
| 2007/0014349 A1 | 1/2007 | Bao et al. | |
| 2007/0053431 A1 | 3/2007 | Cammas et al. | |
| 2007/0091997 A1 | 4/2007 | Fogg et al. | |
| 2007/0098079 A1 | 5/2007 | Boyce et al. | |
| 2007/0121723 A1 | 5/2007 | Mathew et al. | |
| 2007/0140354 A1 | 6/2007 | Sun | |
| 2007/0153896 A1 | 7/2007 | Song et al. | |
| 2007/0160153 A1 | 7/2007 | Sullivan | |
| 2007/0171969 A1 | 7/2007 | Han et al. | |
| 2007/0201551 A1 | 8/2007 | Wang et al. | |
| 2007/0217500 A1 | 9/2007 | Gao et al. | |
| 2007/0223579 A1 | 9/2007 | Bao | |
| 2007/0223582 A1 | 9/2007 | Borer | |
| 2007/0230575 A1 | 10/2007 | Han | |
| 2007/0274396 A1 | 11/2007 | Zhang et al. | |
| 2008/0013630 A1 | 1/2008 | Li et al. | |
| 2008/0024513 A1 | 1/2008 | Raveendran | |
| 2008/0084930 A1 | 4/2008 | Sekiguchi et al. | |
| 2008/0123947 A1 | 5/2008 | Moriya et al. | |
| 2008/0152000 A1 | 6/2008 | Kaushik | |
| 2008/0165848 A1 | 7/2008 | Ye et al. | |
| 2008/0267289 A1 | 10/2008 | Yu et al. | |
| 2008/0304567 A1 | 12/2008 | Boyce et al. | |
| 2009/0060034 A1 | 3/2009 | Park et al. | |
| 2010/0142615 A1 | 6/2010 | Han | |

FOREIGN PATENT DOCUMENTS

| | | |
|---|---|---|
| CN | 1728833 | 2/2006 |
| CN | 101040533 | 9/2007 |
| EP | 1 401 211 | 3/2000 |
| EP | 1 617 672 | 1/2006 |
| EP | 1 617 677 | 1/2006 |
| JP | 4-207684 | 7/1992 |
| JP | 2000-134618 | 5/2000 |
| JP | 2000-506687 | 5/2000 |
| JP | 2000-165661 | 6/2000 |
| JP | 2000-165866 | 6/2000 |
| JP | 2000-242774 | 9/2000 |
| JP | 2001-197527 | 7/2001 |
| JP | 2002-152498 | 5/2002 |
| JP | 2004-506355 | 2/2004 |
| JP | 2005-217940 | 8/2005 |
| JP | 2006-521039 | 9/2006 |
| JP | 2007-519273 | 7/2007 |
| JP | 2007-538439 | 12/2007 |
| JP | 2008-035029 | 2/2008 |
| KR | 2002-0081777 | 10/2002 |
| RU | 2191469 | 10/2002 |
| SU | 1506554 | 9/1989 |
| WO | WO 98/41029 | 9/1998 |
| WO | WO 99/09748 | 2/1999 |
| WO | WO 00/33581 | 6/2000 |
| WO | WO 00/74385 | 12/2000 |
| WO | WO 01/95633 | 12/2001 |
| WO | WO 02/01881 | 1/2002 |
| WO | WO 02/50772 | 6/2002 |

| | | |
|---|---|---|
| WO | WO 02/054777 | 7/2002 |
| WO | WO 02/085026 | 10/2002 |
| WO | WO 02/096120 | 11/2002 |
| WO | WO 03/007619 | 1/2003 |
| WO | WO 03/061294 | 7/2003 |
| WO | WO 03/107683 | 12/2003 |
| WO | WO 2004/008771 | 1/2004 |
| WO | WO 2004/036919 | 4/2004 |
| WO | WO 2006/006777 | 1/2006 |
| WO | WO 2008/004816 | 1/2006 |
| WO | WO 2006/079997 | 8/2006 |
| WO | WO 2006/109135 | 10/2006 |
| WO | WO 2006/112620 | 10/2006 |
| WO | WO 2006/125713 | 11/2006 |
| WO | WO 2007/008286 | 1/2007 |
| WO | WO 2007/009875 | 1/2007 |
| WO | WO 2007/042365 | 4/2007 |
| WO | WO 2007/114617 | 10/2007 |
| WO | WO 2008/049446 | 5/2008 |

OTHER PUBLICATIONS

Andreopoulos et al., "Fully-Scalable Wavelet Video Coding Using In-Band Motion Compensated Temporal Filtering," *IEEE International Conference on Acoustics, Speech, and Signal Processing. IEEE*, 4 pp. (Apr. 2003).

Andreopoulos et al., "Wavelet-Based Fully-Scalable Video Coding With In-Band Prediction," *Proc. 3rd IEEE Benelux Signal Processing Symposium* (SPS-2002), pp. S02 1 to S02-4 (Mar. 2002).

Anonymous, "Video Subgroup Schedule, 68th MPEG Meeting," 6 pp. (Mar. 2004).

Beerman et al., "Low-complexity Spatial Up-scaling Methods for Low-resolution Video Coding," 6 pp. (2004).

Brainard et al., "Composite Television Coding: Subsampling and Interpolation," SMPTE Journal, pp. 717-724 (Aug. 1982).

Catmull et al., "A Class of Local Interpolating Splines," Computer Aided Geometric Design, Academic Press, pp. 317-326 (Mar. 1974).

Chang et al., "A Scalable Video Compression Technique Based on Wavelet Transform and MPEG Coding" *IEEE Trans. on Consumer Electronics*, vol. 45, No. 3, pp. 788-793 (Aug. 1999).

Chen et al., "Adaptive Joint Source-Channel Coding using Rate Shaping," *ICASSP*, 4 pp. (May 2002).

Chen et al., "Bidirectional MC-EZBC with Lifting Implementation," 26 pp. (document marked May 2003).

Chen et al., "Frame Loss Error Concealment for SVC," *Journal of Zhejiang Univ.—Science A*, vol. 7, No. 5, pp. 677-683 (May 2006).

Choi et al., "Motion-compensated 3-D subband coding of video," *IEEE Trans. on Image Processing*, vol. 8, No. 2, pp. 155-167 (Feb. 1999).

Chooi et al., "3D Subband Coder for Very Low Bit Rates" *IEEE*, pp. 405-408 (Apr. 1994).

Decision on Grant dated Dec. 3, 2010, from Russian Patent Application No. 2008127319, 7 pp.

"DivX Multi Standard Video Encoder," 2 pp. (Downloaded from the World Wide Web on Jan. 24, 2006).

Dufaux et al., "Abstract: Motion-compensated generic coding of video based on a multi resolution data structure," 2 pp. (1993) [downloaded from the World Wide Web on Jan. 25, 2006].

Dufaux et al., " Motion-compensated generic coding of video based on a multi resolution data structure," Optical Engineering, vol. 32, No. 7, pp. 1559-1570 (Jul. 1993).

Einarsson et al., "Mixed Resolution Video Coding for Low Bit-Rate Channels," *Proc. Int'l Workshop on Coding Techniques for Very Low Bit-Rate Video: VLBV97*, Linköping, Sweden, pp. 77-80 (Jul. 1997).

First Office Action dated Mar. 29, 2010, from Australian Patent Application No. 2007205175, 1p.

First Office Action dated Jan. 8, 2010, from Chinese Patent Application No. 200780001989.6, 11pp.

Gharavi et al., "Video Coding and Distribution over ATM for Multipoint Teleconferencing," GLOBECOM '93, 7 pp. (1993).

Han et al., "Robust and Efficient Scalable Video Coding with Leaky Prediction," *IEEE Int'l Conf. on Image Processing*, vol. 2, 4 pp. (Sep. 2002).

International Search Report dated Jul. 16, 2007, from PCT Patent Application No. PCT/US2007/000195, 3 pp.

ISO/IEC, "ISO/IEC 11172-2: Information Technology—Coding of Moving Pictures and Associated Audio for Storage Media at up to About 1.5 Mbit/s," 122 pp. (Aug. 1993).

ISO/IEC 14496-10, Joint Video Team (JVT) of ISO/IEC MPEG & ITU-T VCEG, Joint Draft 6, Apr. 2006, 527 pgs.

ISO/IEC, "Information Technology—Coding of Audio-Visual Objects: Visual, ISO/IEC 14496-2, Committee Draft," 330 pp. (Mar. 1998).

ISO/IEC JTC1/SC29/WG11 MPEG2003/N6193, "Call for Proposals on Scalable Video Coding Technology," 12 pp. (Dec. 2003).

ISO/IEC JTC1/SC29/WG11 MPEG2004/W6383, "Subjective test results for the CfP on Scalable Video Coding Technology," 17 pp. (Mar. 2004).

ITU, Recommendation H.261, "Line Transmission of Non-Telephone Signals," 28 pp. (Mar. 1993).

ITU-T, "ITU-T Recommendation H.262: Information Technology—Generic Coding of Moving Pictures and Associated Audio Information: Video," 218 pp. (Jul. 1995).

ITU-T, "ITU-T Recommendation H.263: Video Coding for Low Bit Rate Communication," 167 pp. (Feb. 1998).

ITU, "ITU-T Recommendation H.264: Advanced Video Coding for generic audiovisual services," 281 pp. (May 2003).

Iwahashi et al., "A Motion Compensation Technique for Downscaled Pictures in Layered Coding," *IEICE Transactions on Comm.*, vol. E77-B , No. 8, pp. 1007-1012 (Aug. 1994).

Ji et al., "Architectures of Incorporating MPEG-4 AVC into Three-Dimensional Wavelet Video Coding," *Picture Coding Symposium 2004*, 6 pp. (Dec. 2004).

Ji et al., "Three-Dimensional Subband Scalable Video Coding Embedded with H.264/AVC/ Codec," Proc of SPIE, vol. 5960, pp. 201-209 (Jul. 2005).

Joint Video Team (JVT) of ISO/IEC MPEG & ITU-T VCEG, "Joint Final Committee Draft (JFCD) of Joint Video Specification," JVT-D157, 207 pp. (Aug. 2002).

Joint Video Team (JVT) of ISO/IEC MPEG and ITU-T VCEG, "Draft of Joint Scalable Video Model JSVM-4 Annex G," JVT-Q201, Nice, France, 166 pp. (Oct. 2005).

Joint Video Team (JVT) of ISO/IEC MPEG and ITU-T VCEG, "Joint Draft 7 of SVC Amendment (revision 2)," JVT-T201r2, Annex G, Klagenfurt, Austria, pp. i-xvii, 353-540 (Jul. 2006).

Karlsson et al., "Subband Coding of Video for Packet Networks" *Optical Engineering*, vol. 27, No. 7, pp. 574-586 (Jul. 1988).

Keys, "Cubic Convolution Interpolation for Digital Image Processing," Computer Graphics, vol. ASSP-29, No. 6, pp. 1153-1160 (Dec. 1981).

Kirenko et al., "Modification of 3d Wavelet Scalable Video Coding" Philips Research Laboratories, The Netherlands, 6 pp. (document not dated).

Kwon et al., "Adaptive Bitrate Allocation in Spatial Scalable Video Coding of Fixed Total Bitrate," *IEICE Trans. Fundamentals*, vol. E81-A, No. 5, pp. 950-956 (May 1998).

Luo et al., "Advanced Lifting-based Motion Threading (MTh) Technique for the 3D Wavelet Video Coding," *Proceedings of the SPIE/ IEEE Visual Communications and Image Processing (VCIP2003)*, vol. 5150, pp. 707-718 (Jun. 2003).

Luo et al., "Motion Compensated Lifting Wavelet and Its Application in Video Coding," *Proceedings of the IEEE Int. Conf. on Multimedia and Expo*, 4 pp. (Aug. 2001).

Mehrseresht et al., "Adaptively Weighted Update Steps in Motion Compensated Lifting Based on Scalable Video Compression," *Proceedings of the IEEE Int. Conf. on Image Processing*, vol. 2, 4 pp. (Sep. 2003).

Meijering, A Chronology of Interpolation: From Ancient Astronomy to Modern Signal and Image Processing,: IEEE vol. 90, No. 3, pp. 319-342 (Mar. 2002).

Meijering, "Prolog to a Chronology of InterpolationL From Ancient Astronomy to Modern Signal and Image Processing," IEEE vol. 90, No. 3, pp. 317-318 (Mar. 2002).

Meijering et al., "A Note on Cubic Convolution Interpolation," IEEE Transactions on Image Processing, vol. 12, No. 4, pp. 477-479 (Apr. 2003).

Mitchell et al., "Reconstruction Filters in Computer Graphics," Computer Graphics, vol. 22, No. 4 pp. 221-228 (Aug. 1988).

Office action dated Aug. 25, 2010, from Mexican Patent Application No. MX/a/2008/008762, 2 pp.

Office action dated May 13, 2010, from Russian Patent Application No. 2008127319, 3 pp.

Ohm, "Three Dimensional Subband Coding with Motion Compensation," *IEEE Trans. on Image Processing*, vol. 3, No. 5, pp. 559-571 (Sep. 1994).

Pesquet-Popescu et al., "Three-dimensional Lifting Schemes for Motion Compensated Video Compression," *ICASSP*, vol. 3, 4 pp. (2001).

Printouts of FTP directories from http://ftp3.itu.ch, 8 pp. (downloaded from the World Wide Web on Sep. 20, 2005).

Reader, "History of MPEG Video Compression—Ver. 4.0," 99 pp. (document marked Dec. 16, 2003).

Regunathan, "Flexible 4-tap Filters for Texture Upsampling in Spatial Scalability," JVT-U123, Hangzhou, China, 10 pp. (Oct. 2006).

Regunathan, "Flexible 4-tap Filters for Texture Upsampling in Spatial Scalability," JVT-V074, Marrakech, Morocco, 14 pp. (Jan. 2007).

Santa Cruz, "JVT-O061-CE9verif.doc," 2 pp. (downloaded from the World Wide Web on May 10, 2005.).

Schwarz et al., "Overview of the Scalable H.264/MPEG4-AVC Extension," IEEE Int'l Conf. on Image Processing, 4 pp. (Oct. 2006).

Schwarz et al., "Overview of the Scalable Video Coding Extension of the H.264/AVC Standard," IEEE Transactions on Circuits and Systems for Video Technology, 18 pp. (Sep. 2007).

Sebe et al., "An Overcomplete Discrete Wavelet Transform for Video Compression," *IEEE Int'l Conf. on Multimedia and Expo*, 4 pp. (Nov. 2002).

Secker et al., "Highly Scalable Video Compression Using a Lifting-based 3D Wavelet Transform with Deformable Mesh Motion Compensation," *IEEE Intl Conf. on Image Processing*, vol. 3, 4 pp. (Jun. 2002).

Secker et al., "Lifting-based Invertible Motion Adaptive Transform (LIMAT) Framework for Highly Scalable Video Compression," *IEEE Trans. Image Processing*, vol. 12, 35 pp. (Dec. 2003).

Segall et al., "Adaptive Upsampling for Spatially Scalable Coding," JVT-O010, Busan, KR, 10 pp. (Apr. 2005).

Segall, "CE4: Evaluation of Texture Upsampling with 4-tap Cubic-Spline Filter," JVT-U042, Hangzhou, China, 6 pp. (Oct. 2006).

Segall, "Study of Upsampling/Downsampling for Spatial Scalability," JVT-Q083, Nice, France, 18 pp. (Oct. 2005).

Song et al., "Content Adaptive Update Steps for Lifting-Based Motion Compensated Temporal Filtering," *Picture Coding Symposium*, 5 pp. (Dec. 2004).

Srinivasan et al., "Windows Media Video 9: Overview and Applications," *Signal Processing: Image Communication*, vol. 19, No. 9, pp. 851-875 (Oct. 2004).

Sullivan, "Color Format Upconversion for Video Display," JVT-I019, San Diego, 6 pp. (Sep. 2003).

Sullivan et al., "The H.264/AVC Advanced Video Coding Standard: Overview and Introduction to the Fidelity Range Extensions," 21 pp. (Aug. 2004).

Sullivan, "Position Calculation for SVC Upsampling," JVT-R067, Bangkok, Thailand, 7 pp. (Jan. 2006).

Sullivan et al., "Position Calculation for SVC Upsampling," JVT-S067, Geneva, Switzerland, 12 pp. (Mar. 2006).

Sullivan, "Position Calculation for SVC Upsampling," JVT-U067, Hangzhou, China, 7 pp. (Oct. 2006).

Sullivan, "Resampling Filters for SVC Upsampling," JVT-R066, Meeting: Bangkok, Thailand, 9 pp. (Jan. 2006).

Sun et al., "Seamless Switching of Scalable Video Bitstreams for Efficient Streaming," *IEEE Transactions on Multimedia*, vol. 6, No. 2, pp. 291-303 (Apr. 2004).

Sun et al., "Unified Solution for Spatial Scalability," JVT-R018, Bangkok, Thailand, 6 pp. (Jan. 2006).

Sun, "Texture Upsampling with 4-tap Cubic-Spline Filter," JVT-T057r1, Klagenfurt,Austria, 8 pp. (Jul. 2006).

Sun, "Upsampling Filter Design with Cubic Splines," JVT-S016, Geneva, Switzerland, 9 pp. (Mar.-Apr. 2006).

Tomasi et al., "Bilateral Filtering for Gray and Color Images," *IEEE Intl Conf. on Computer Vision*, 8 pp. (Jan. 1998).

Tu et al., "CE4: 4-tap Motion Compensation Interpolation Filter for High Resolution SVC Enhancement Layers," JVT-W068, 9 pp. (Apr. 2007).

Video Compression 1: H 261—Multimedia Systems (Module 4 Lesson 2), 5 pp. (document not dated).

Volleberg et al., "Generic Topology for FIR Filter Based Up- and Down-Sampling," 4 pp. (Apr. 2004).

Voloshynovskiy et al., "A Stochastic Approach to Content Adaptive Digital Image Watermarking," 26 pp. (Sep. 1999).

Wang et al., "Adaptive Image Matching in the Subband Domain," *Proc. SPIE*, 12 pp. (Dec. 2004).

Wang et al., "WZS: Wyner-Ziv Scalable Predictive Video Coding," Proc. Picture Coding Symposium, 6 pp. (Dec. 2004).

Wedi, "Adaptive Interpolation Filter for Motion Compensated Hybrid Video Coding," *Picture Coding Symposium*, 4 pp. (Apr. 2001).

Wedi, "Adaptive Interpolation Filter for Motion Compensated Prediction," *IEEE*, 4 pp. (Dec. 2002).

Wedi, "Adaptive Interpolation Filters and High-Resolution Displacements for Video Coding," *IEEE Trans. on Circuits and Systems for Video Technology*, pp. 484-491 (Apr. 2006).

Wien, "Variable Block-Size Transforms for Hybrid Video Coding," Dissertation, 182 pp. (Feb. 2004).

Written Opinion dated Jul. 16, 2007, from PCT Application No. PCT/US2007/000195, 5 pp.

Wu et al., "SMART: An Efficient, Scalable and Robust Streaming Video System," *EURASIP on Applied Signal Processing*, vol. 2, 39 pp. (Feb. 2004).

Xiong et al., "Exploiting Temporal Correlation with Adaptive Block-size Motion Alignment for 3D Wavelet Coding," *SPIE/IEE Visual Communications and Image Processing (VCIP2004)*, 12 pp. (Jan. 2004).

Xiong et al., "Spatial Scalability in 3D Wavelet Coding with Spatial Domain MCTF Encoder," *Picture Coding Symposium*, 6 pp. (Dec. 2004).

Xu et al., "3D Sub-band Video Coding Using Barbell Lifting," MPEG2004/M10569/S05, 14 pp. (downloaded from the World Wide Web on May 10, 2005.).

Xu et al., "Three-Dimensional Embedded Subband Coding with Optimal Truncation (3D ESCOT," *Applied and Computational Harmonic Analysis*, pp. 290-315 (May 2001).

Yang et al., "A Novel Adaptive De-Interlacing Algorithm Based on Motion Compensation," *Microelectronics and Computer*, Issue 9, pp. 4-6 (Sep. 30, 2004).

Zhao et al., "Macroblock Skip-Mode Prediction for Complexity Control of Video Encoders," *IEEE Int'l Conf. on Visual Information Engineering*, 4 pp. (Jul. 2003).

Abhayaratne, "2D Wavelet Transforms with a Spatially Adaptive 2D Low Pass Filter," *Signal Processing Symp.*, pp. 93-96 (Jun. 2004).

Abhayaratne, "Spatially Adaptive Integer Lifting with No Side Information for Lossless Video Coding," *Picture Coding Symp.*, 6 pp. (Apr. 2003).

Andreopoulos et al., "Complete-to-Overcomplete Discrete Wavelet Transforms for Scalable Video Coding with MCTF," *Proc. SPIE Visual Communications and Image Processing*, pp. 719-731 (Jul. 2003).

Bjontegaard et al., "H.263 Anchors—Technical Description," MPEG95/0322 (1995).

Bottreau et al., "A Fully Scalable 3D Subband Video Codec," *Proc. Int'l Conf. on Image Processing*, vol. 2, pp. 1017-1020 (Oct. 2001).

Chen et al., "Improved MC-EZBC with Quarter-pixel Motion Vectors," ISO/IEC JTC1/SC29/WG11, MPEG2002/m8366, Fairfax (2002).

Chen et al., "Improvements to the MC-EZBC Scalable Video Coder," ICIP 2003, vol. 2, pp. 14-17 (Sep. 2003).

Decision on Grant dated Jan. 27, 2012, from Russian Patent Application No. 2011106505, 17 pp.

ISO/IEC JTC1/SC29/WG11 MPEG2004/M11126, "Spatial Scalability in 3D Wavelet Coding with Spatial Domain MCTF Encoder," 14 pp. (Jul. 2004).

Kim et al., "Low Bit-Rate Scalable Video Coding with 3-D Set Partitioning in Hierarchical Trees (3-D SPIHT)," *IEEE Trans.on Circuits and Systems for Video Technology*, vol. 10, No. 8, pp. 1374-1387 (Dec. 2000).

Li et al., "All-phase Motion Compensated Prediction for High Performance Video Coding," Proc. ICIP, vol. 3, pp. 538-541 (2001).

Netravali et al., "Adaptive Quantization of Picture Signals Using Spatial Masking," *Proc. IEEE*, vol. 65, pp. 536-548 (1977).

Niu et al., "MPEG-4 Video Encoder Based on DSP-FPGA Techniques," *IEEE Int'l Conf. on Communications, Circuits and Systems*, vol. 1, pp. 518-522 (May 2005).

Notice of Acceptance dated Jun. 20, 2011, from Australian Patent Application No. 2010219337, 2 pp.

Notice of Allowance dated Sep. 14, 2011, from Mexican Patent Application No. MX/a/2008/008762, 1 p.

Notice on the First Office Action dated Feb. 28, 2012, from Chinese Patent Application No. 201110120389.X, 8 pp.

Notice of Rejection dated Nov. 25, 2011, from Japanese Patent Application No. 2008-549559, 10 pp.

Office action dated Apr. 12, 2011, from Mexican Patent Application No. MX/a/2008/008762, 2 pp.

Piella et al., "An Adaptive Update Lifting Scheme with Perfect Reconstruction," *IEEE Int'l Conf. on Image Processing*, vol. 3, pp. 190-193 (Oct. 2001).

Sullivan, "Color Format Upconversion for Video Display," JVT-I019r2, San Diego, 6 pp. (Sep. 2003).

Sullivan, "Resampling Filters for SVC Upsampling," JVT-R066, Bangkok, Thailand, 9 pp. (Jan. 2006).

Sun, "Resampling Process for Interlaced Materials in SVC," JVT-Rxxx, Meeting: Bangkok, Thailand, 9 pp. (Jan. 2006).

Turaga et al., "Content-adaptive filtering in the UMCTF framework," *IEEE Proc. Int'l Conf. on Acoustics, Speech and Signal Processing*, vol. 3, pp. 621-624 (Apr. 2003).

Ye et al., "Fully Scalable 3-D Overcomplete Wavelet Video Coding using Adaptive Motion Compenstated Temporal Filtering," *Proc. SPIE Visual Communications and Image Processing*, pp. 1169-1180 (Jul. 2003).

U.S. Appl. No. 11/127,001.
U.S. Appl. No. 11/126,997.
U.S. Appl. No. 11/126,650.
U.S. Appl. No. 11/650,531.
U.S. Appl. No. 12/074,030.
U.S. Appl. No. 12/077,768.
U.S. Appl. No. 12/205,689.
U.S. Appl. No. 12/197,922.
U.S. Appl. No. 13/102,943.
U.S. Appl. No. 10/644,258.
U.S. Appl. No. 10/960,356.
U.S. Appl. No. 11/118,686.
U.S. Appl. No. 11/726,395.

Notice of Preliminary Rejection dated Jan. 30, 2013, from Korean Patent Application No. 10-2008-7016381 (with English translation), 7 pp.

Notice on Grant of Patent dated Dec. 5, 2012, from Chinese Patent Application No. 201110120389.X, 4 pp.

Notice of Preliminary Rejection dated Jan. 30, 2013, from Korean Patent Application No. 10-2008-7016381, 4 pp.

Notice of Rejection dated Jan. 25, 2013, from Japanese Patent Application No. 2008-549559, 4 pp.

Notice of Allowance dated May 21, 2013, from Japanese Patent Application No. 2008-549559, 6 pp.

Notice of Preliminary Rejection dated May 16, 2013, from Korean Patent Application No. 10-2008-7016381, 3 pp. (no English translation available).

* cited by examiner

Software 180 implementing video encoder
or decoder with described video encoding
and decoding techniques and tools

Figure 5D

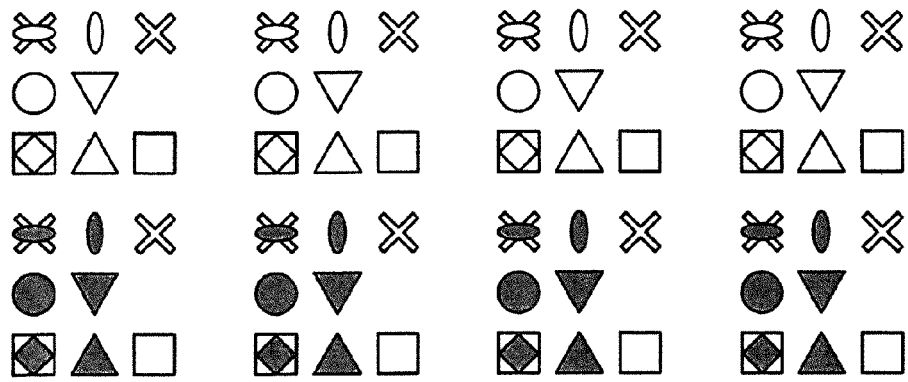

 : Luma sample, top field
 : Chroma sample, top field, Type 0
 : Chroma sample, top field, Type 1
 : Chroma sample, top field, Type 2
 : Chroma sample, top field, Type 3
 : Chroma sample, top field, Type 4
 : Chroma sample, top field, Type 5

 : Luma sample, bottom field
 : Chroma sample, bottom field, Type 0
 : Chroma sample, bottom field, Type 1
 : Chroma sample, bottom field, Type 2
 : Chroma sample, bottom field, Type 3
 : Chroma sample, bottom field, Type 4
 : Chroma sample, bottom field, Type 5

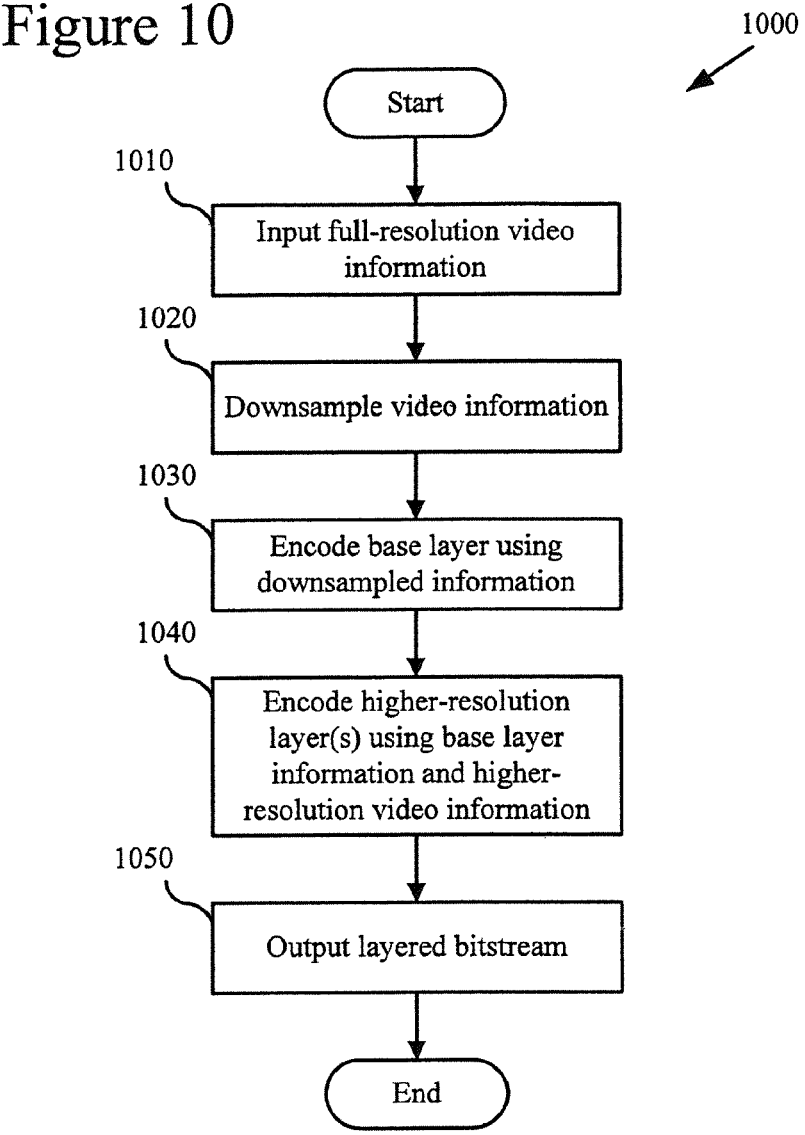

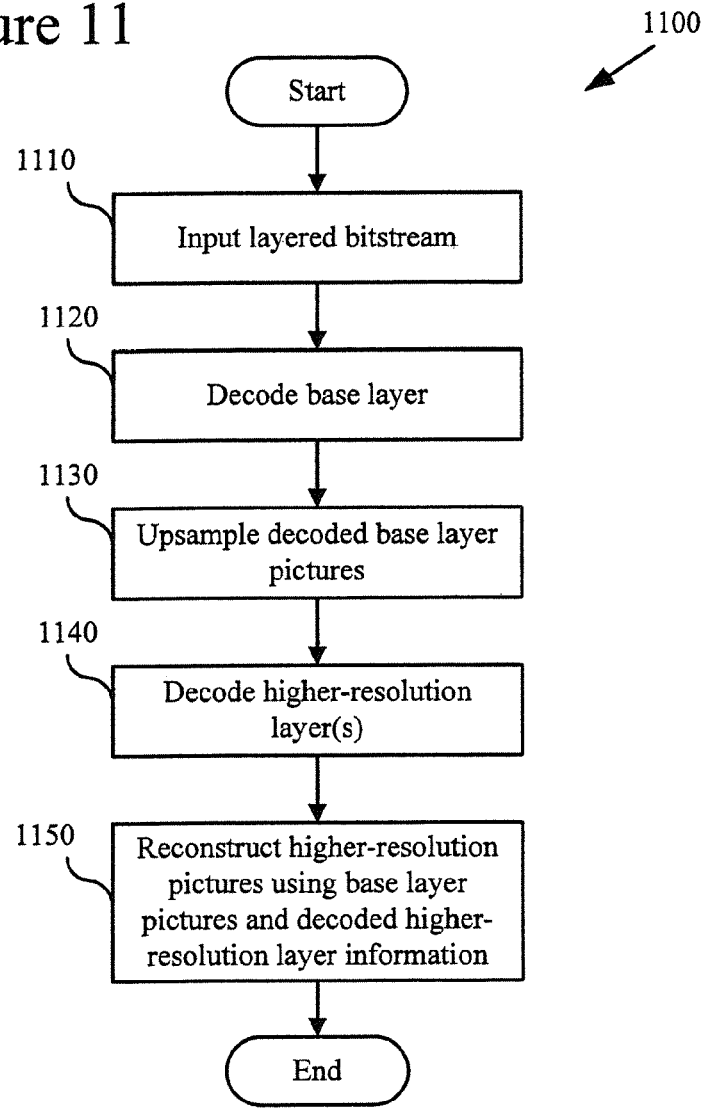

Figure 12

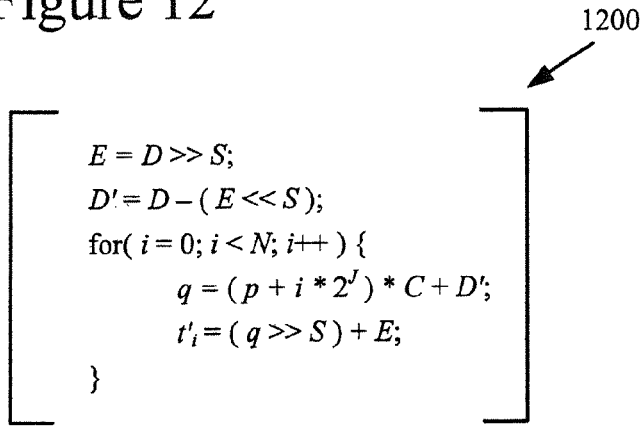

$$\begin{bmatrix} E = D \gg S; \\ D' = D - (E \ll S); \\ \text{for}(\ i = 0;\ i < N;\ i\text{++}\ )\ \{ \\ \qquad q = (p + i * 2^J) * C + D'; \\ \qquad t'_i = (q \gg S) + E; \\ \} \end{bmatrix}$$

Figure 13

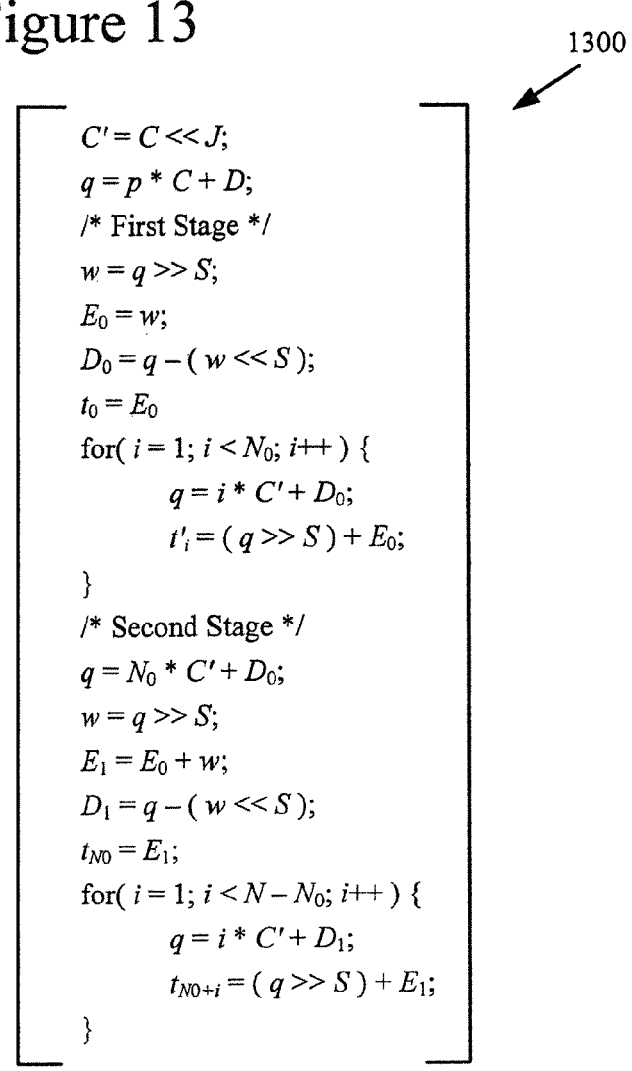

$$\begin{bmatrix} C' = C \ll J; \\ q = p * C + D; \\ /\text{* First Stage *}/ \\ w = q \gg S; \\ E_0 = w; \\ D_0 = q - (w \ll S); \\ t_0 = E_0 \\ \text{for}(\ i = 1;\ i < N_0;\ i\text{++}\ )\ \{ \\ \qquad q = i * C' + D_0; \\ \qquad t'_i = (q \gg S) + E_0; \\ \} \\ /\text{* Second Stage *}/ \\ q = N_0 * C' + D_0; \\ w = q \gg S; \\ E_1 = E_0 + w; \\ D_1 = q - (w \ll S); \\ t_{N_0} = E_1; \\ \text{for}(\ i = 1;\ i < N - N_0;\ i\text{++}\ )\ \{ \\ \qquad q = i * C' + D_1; \\ \qquad t_{N_0+i} = (q \gg S) + E_1; \\ \} \end{bmatrix}$$

Figure 14 ↙ 1400

$$\begin{bmatrix} C' = C \ll J; \\ E = 0; \\ \\ q = p * C + D; \\ w = q \gg S; \\ D' = q - (w \ll S); \\ E \mathrel{+}= w; \\ t_0 = E; \\ \\ \text{for}(\ i = 1;\ i < N;\ i\mathord{+}\mathord{+}\ )\ \{ \\ \quad q = C' + D' \\ \quad w = q \gg S; \\ \quad D' = q - (w \ll S); \\ \quad E \mathrel{+}= w; \\ \quad t'_i = E; \\ \} \end{bmatrix}$$

RESAMPLING AND PICTURE RESIZING OPERATIONS FOR MULTI-RESOLUTION VIDEO CODING AND DECODING

RELATED APPLICATION INFORMATION

The present application is a continuation of U.S. patent application Ser. No. 11/650,531, now U.S. Pat. No. 7,956,930, entitled "Resampling and Picture Resizing Operations for Multi-Resolution Video Coding and Decoding," filed Jan. 5, 2007, the disclosure of which is incorporated by reference. U.S. patent application Ser. No. 11/650,531, now U.S. Pat. No. 7,956,930 claims the benefit of U.S. Provisional Patent Application No. 60/756,846, entitled "Resampling Filters For Scalable Video Coding And Decoding," filed Jan. 6, 2006, the disclosure of which is incorporated by reference. U.S. patent application Ser. No. 11/650,531, now U.S. Pat. No. 7,956,930 also claims the benefit of U.S. Provisional Patent Application No. 60/786,573, entitled "Resizing Operations For Scalable Video Coding And Decoding," filed Mar. 27, 2006, the disclosure of which is incorporated by reference. U.S. patent application Ser. No. 11/650,531, now U.S. Pat. No. 7,956,930 also claims the benefit of U.S. Provisional Patent Application No. 60/829,515, entitled "High Accuracy Position Calculation For Picture Resizing," filed Oct. 13, 2006, the disclosure of which is incorporated by reference.

TECHNICAL FIELD

Techniques and tools for encoding/decoding digital video are described.

BACKGROUND

With the increased popularity of DVDs, music delivery over the Internet, and digital cameras, digital media have become commonplace. Engineers use a variety of techniques to process digital audio, video, and images efficiently while still maintaining quality. To understand these techniques, it helps to understand how the audio, video, and image information is represented and processed in a computer.

I. Representation of Media Information in a Computer

A computer processes media information as a series of numbers representing that information. For example, a single number may represent the intensity of brightness or the intensity of a color component such as red, green or blue for each elementary small region of a picture, so that the digital representation of the picture consists of one or more arrays of such numbers. Each such number may be referred to as a sample. For a color image, it is conventional to use more than one sample to represent the color of each elemental region, and typically three samples are used. The set of these samples for an elemental region may be referred to as a pixel, where the word "pixel" is a contraction referring to the concept of a "picture element." For example, one pixel may consist of three samples that represent the intensity of red, green and blue light necessary to represent the elemental region. Such a pixel type is referred to as an RGB pixel. Several factors affect quality of media information, including sample depth, resolution, and frame rate (for video).

Sample depth is a property normally measured in bits that indicates the range of numbers that can be used to represent a sample. When more values are possible for the sample, quality can be higher because the number can capture more subtle variations in intensity and/or a greater range of values. Resolution generally refers to the number of samples over some duration of time (for audio) or space (for images or individual video pictures). Images with higher spatial resolution tend to look crisper than other images and contain more discernable useful details. Frame rate is a common term for temporal resolution for video. Video with higher frame rate tends to mimic the smooth motion of natural objects better than other video, and can similarly be considered to contain more detail in the temporal dimension. For all of these factors, the tradeoff for high quality is the cost of storing and transmitting the information in terms of the bit rate necessary to represent the sample depth, resolution and frame rate, as Table 1 shows.

TABLE 1

Bit rates for different quality levels of raw video

| Bits Per Pixel (sample depth times samples per pixel) | Resolution (in pixels, Width × Height) | Frame Rate (in frames per second) | Bit Rate (in millions of bits per second) |
|---|---|---|---|
| 8 (value 0-255, monochrome) | 160 × 120 | 7.5 | 1.2 |
| 24 (value 0-255, RGB) | 320 × 240 | 15 | 27.6 |
| 24 (value 0-255, RUB) | 640 × 480 | 30 | 221.2 |
| 24 (value 0-255, RGB) | 1280 × 720 | 60 | 1327.1 |

Despite the high bit rate necessary for storing and sending high quality video (such as HDTV), companies and consumers increasingly depend on computers to create, distribute, and play back high quality content. For this reason, engineers use compression (also called source coding or source encoding) to reduce the bit rate of digital media. Compression decreases the cost of storing and transmitting the information by converting the information into a lower bit rate form. Compression can be loss less, in which quality of the video does not suffer but decreases in bit rate are limited by the complexity of the video. Or, compression can be lossy, in which quality of the video suffers but decreases in bit rate are more dramatic. Decompression (also called decoding) reconstructs a version of the original information from the compressed form. A "codec" is an encoder/decoder system.

In general, video compression techniques include "intra" compression and "inter" or predictive compression. For video pictures, intra compression techniques compress individual pictures. Inter compression techniques compress pictures with reference to preceding and/or following pictures.

II. Multi-Resolution Video and Spatial Scalability

Standard video encoders experience a dramatic degradation in performance when the target bit rate falls below a certain threshold. Quantization and other lossy processing stages introduce distortion. At low bitrates, high frequency information may be heavily distorted or completely lost. As a result, significant artifacts can arise and cause a substantial drop in the quality of the reconstructed video. Although available bit rates increase as transmission and processing technology improves, maintaining high visual quality at constrained bit rates remains a primary goal of video codec design. Existing codecs use several methods to improve visual quality at constrained bitrates.

Multi-resolution coding allows encoding of video at different spatial resolutions. Reduced resolution video can be encoded at a substantially lower bit rate, at the expense of lost information. For example, a prior video encoder can downsample (using a downsampling filter) full-resolution video and encode it at a reduced resolution in the vertical and/or horizontal directions. Reducing the resolution in each direction by half reduces the dimensions of the encoded picture size by half. The encoder signals the reduced resolution coding to a decoder. The decoder receives information indicating reduced-resolution encoding and ascertains from the received information how the reduced-resolution video should be upsampled (using an upsampling filter) to increase the picture size before display. However, the information that was lost when the encoder downsampled and encoded the video pictures is still missing from the upsampled pictures.

Spatially scalable video uses a multi-layer approach, allowing an encoder to reduce spatial resolution (and thus bit rate) in a base layer while retaining higher resolution information from the source video in one or more enhancement layers. For example, a base layer intra picture can be coded at a reduced resolution, while an accompanying enhancement layer intra picture can be coded at a higher resolution. Similarly, base layer predicted pictures can be accompanied by enhancement layer predicted pictures. A decoder can choose (based on bit rate constraints and/or other criteria) to decode only base layer pictures at the lower resolution to obtain lower resolution reconstructed pictures, or to decode base layer and enhancement layer pictures to obtain higher resolution reconstructed pictures. When the base layer is encoded at a lower resolution than the displayed picture (also referred to as downsampling), the encoded picture size is actually smaller than the displayed picture. The decoder performs calculations to resize the reconstructed picture and uses upsampling filters to produce interpolated sample values at appropriate positions in the reconstructed picture. However, previous codecs that use spatially scalable video have suffered from inflexible upsampling filters and inaccurate or expensive (in terms of computation time or bit rate) picture resizing techniques.

Given the critical importance of video compression and decompression to digital video, it is not surprising that video compression and decompression are richly developed fields. Whatever the benefits of previous video compression and decompression techniques, however, they do not have the advantages of the following techniques and tools.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In summary, the Detailed Description is directed to various techniques and tools for multi-resolution and layered spatially scalable video coding and decoding.

For example, the Detailed Description is directed to various techniques and tools for high accuracy position calculation for picture resizing in applications such as spatially-scalable video coding and decoding. Techniques and tools for high accuracy position calculation for picture resizing in applications such as spatially-scalable video coding and decoding are described. In one aspect, resampling of a video picture is performed according to a resampling scale factor. The resampling comprises computation of a sample value at a position i, j in a resampled array. The computation includes computing a derived horizontal or vertical sub-sample position x or y in a manner that involves approximating a value in part by multiplying a $2^n$ value by an inverse (approximate or exact) of the upsampling scale factor (or dividing the $2^n$ value by the upsampling scale factor or an approximation of the upsampling scale factor). The exponent n may be a sum of two integers including an integer F that represents a number of bits in a fractional component. The approximating can be a rounding or some other kind of approximating, such as a ceiling or floor function that approximates to a nearby integer. The sample value is interpolated using a filter.

Some alternatives of the described techniques provide an altered sample position computation that in one implementation provides approximately one extra bit of precision in the computations without significantly altering the sample position computation process or its complexity. Some further alternatives of the described techniques relate to how the sample position computation operates with 4:2:2 and 4:4:4 sampling structures. These alternative techniques for such sampling structures lock the luma and chroma sample position calculations together whenever the resolution of the chroma and luma sampling grid is the same in a particular dimension.

Additional features and advantages will be made apparent from the following detailed description of various embodiments that proceeds with reference to the accompanying drawings.

BRIEF DESCRIPTION OF THE DRAWINGS

FIG. 5D shows six example spatial alignments of 4:2:0 chroma sample locations relative to luma sample locations for each field of a video frame.

FIG. 10 is a flowchart showing a technique for encoding spatially scalable bitstream layers to allow decoding video at different resolutions.

FIG. 11 is a flowchart showing a technique for decoding spatially scalable bitstream layers to allow decoding video at different resolutions.

FIGS. 12 and 13 are code diagrams showing pseudo-code for an example multi-stage position calculation technique.

FIG. 14 is a code diagram showing pseudo-code for an example incremental position calculation technique.

DETAILED DESCRIPTION

Described embodiments are directed to techniques and tools for multi-resolution and layered spatially scalable video coding and decoding.

The various techniques and tools described herein may be used independently. Some of the techniques and tools may be used in combination (e.g., in different phases of a combined encoding and/or decoding process).

Various techniques are described below with reference to flowcharts of processing acts. The various processing acts shown in the flowcharts may be consolidated into fewer acts or separated into more acts. For the sake of simplicity, the relation of acts shown in a particular flowchart to acts described elsewhere is often not shown. In many cases, the acts in a flowchart can be reordered.

Much of the detailed description addresses representing, coding, and decoding video information. Techniques and tools described herein for representing, coding, and decoding video information may be applied to audio information, still image information, or other media information.

I. Computing Environment

Figure 1:
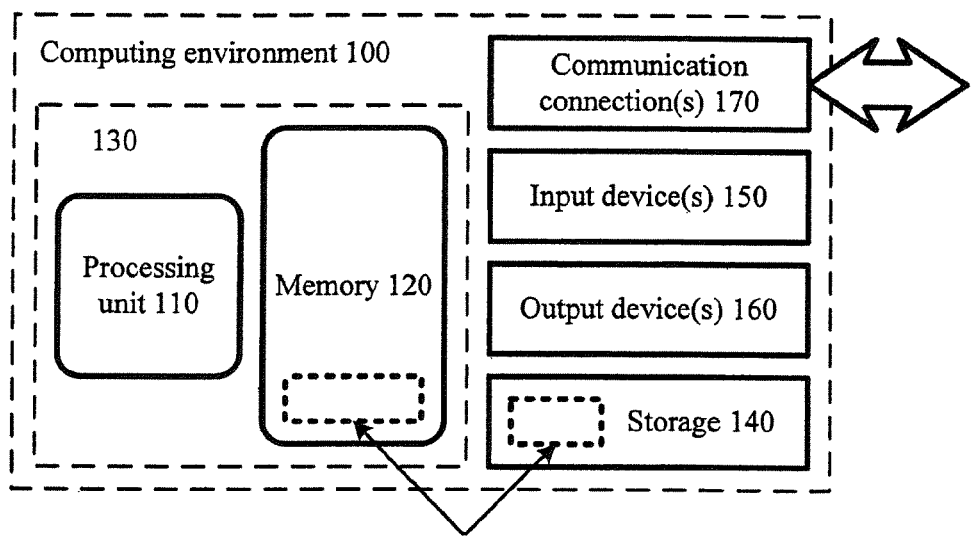
FIG. 1 is a block diagram of a suitable computing environment in conjunction with which several described embodiments may be implemented.

FIG. 1 illustrates a generalized example of a suitable computing environment 100 in which several of the described embodiments may be implemented. The computing environment 100 is not intended to suggest any limitation as to scope of use or functionality, as the techniques and tools may be implemented in diverse general-purpose or special-purpose computing environments.

With reference to FIG. 1, the computing environment 100 includes at least one processing unit 110 and memory 120. In FIG. 1, this most basic configuration 130 is included within a dashed line. The processing unit 110 executes computer-executable instructions and may be a real or a virtual processor. In a multi-processing system, multiple processing units execute computer-executable instructions to increase processing power. The memory 120 may be volatile memory (e.g., registers, cache, RAM), non-volatile memory (e.g., ROM, EEPROM, flash memory, etc.), or some combination of the two. The memory 120 stores software 180 implementing a video encoder or decoder with one or more of the described techniques and tools.

A computing environment may have additional features. For example, the computing environment 100 includes storage 140, one or more input devices 150, one or more output devices 160, and one or more communication connections 170. An interconnection mechanism (not shown) such as a bus, controller, or network interconnects the components of the computing environment 100. Typically, operating system software (not shown) provides an operating environment for other software executing in the computing environment 100, and coordinates activities of the components of the computing environment 100.

The storage 140 may be removable or non-removable, and includes magnetic disks, magnetic tapes or cassettes, CD-ROMs, DVDs, flash memory, or any other medium which can be used to store information and which can be accessed within the computing environment 100. The storage 140 stores instructions for the software 180 implementing the video encoder or decoder.

The input device(s) 150 may be a touch input device such as a keyboard, mouse, pen, touch screen, or trackball, a voice input device, a scanning device, or another device that provides input to the computing environment 100. For audio or video encoding, the input device(s) 150 may be a sound card, video card, TV tuner card, or similar device that accepts audio or video input in analog or digital form, or a CD-ROM, CD-RW or DVD that reads audio or video samples into the computing environment 100. The output device(s) 160 may be a display, printer, speaker, CD- or DVD-writer, or another device that provides output from the computing environment 100.

The communication connection(s) 170 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The techniques and tools can be described in the general context of computer-readable media. Computer-readable media are any available media that can be accessed within a computing environment. By way of example, and not limitation, with the computing environment 100, computer-readable media include memory 120, storage 140, communication media, and combinations of any of the above.

The techniques and tools can be described in the general context of computer-executable instructions, such as those included in program modules, being executed in a computing environment on one or more target real processors or virtual processors. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment.

For the sake of presentation, the detailed description uses terms like "encode," "decode," and "choose" to describe computer operations in a computing environment. These terms are high-level abstractions for operations performed by a computer, and should not be confused with acts performed by a human being. The actual computer operations corresponding to these terms vary depending on implementation.

II. Example Video Encoder and Decoder

Figure 2:
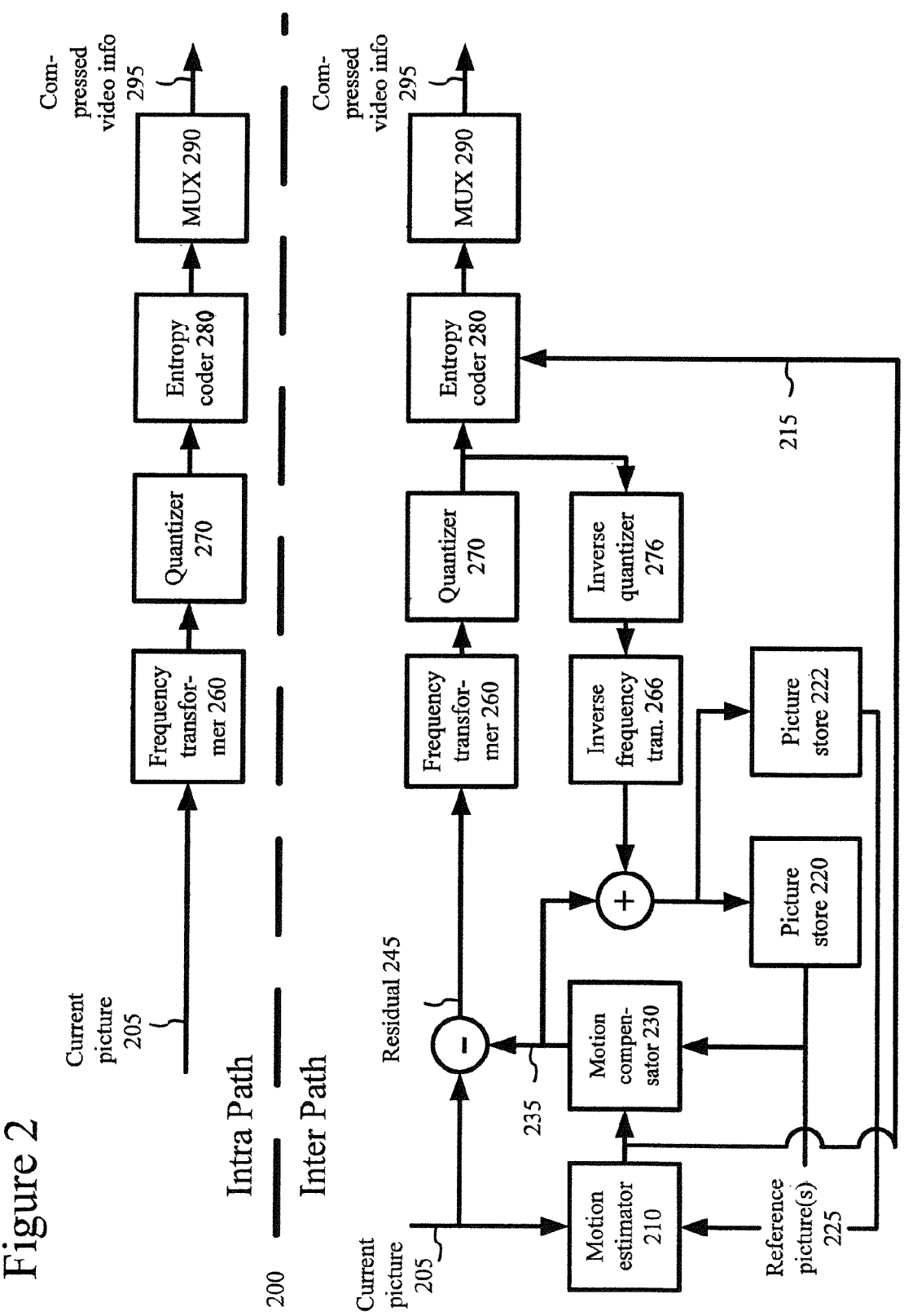
FIG. 2 is a block diagram of a generalized video encoder system in conjunction with which several described embodiments may be implemented.
Figure 3:
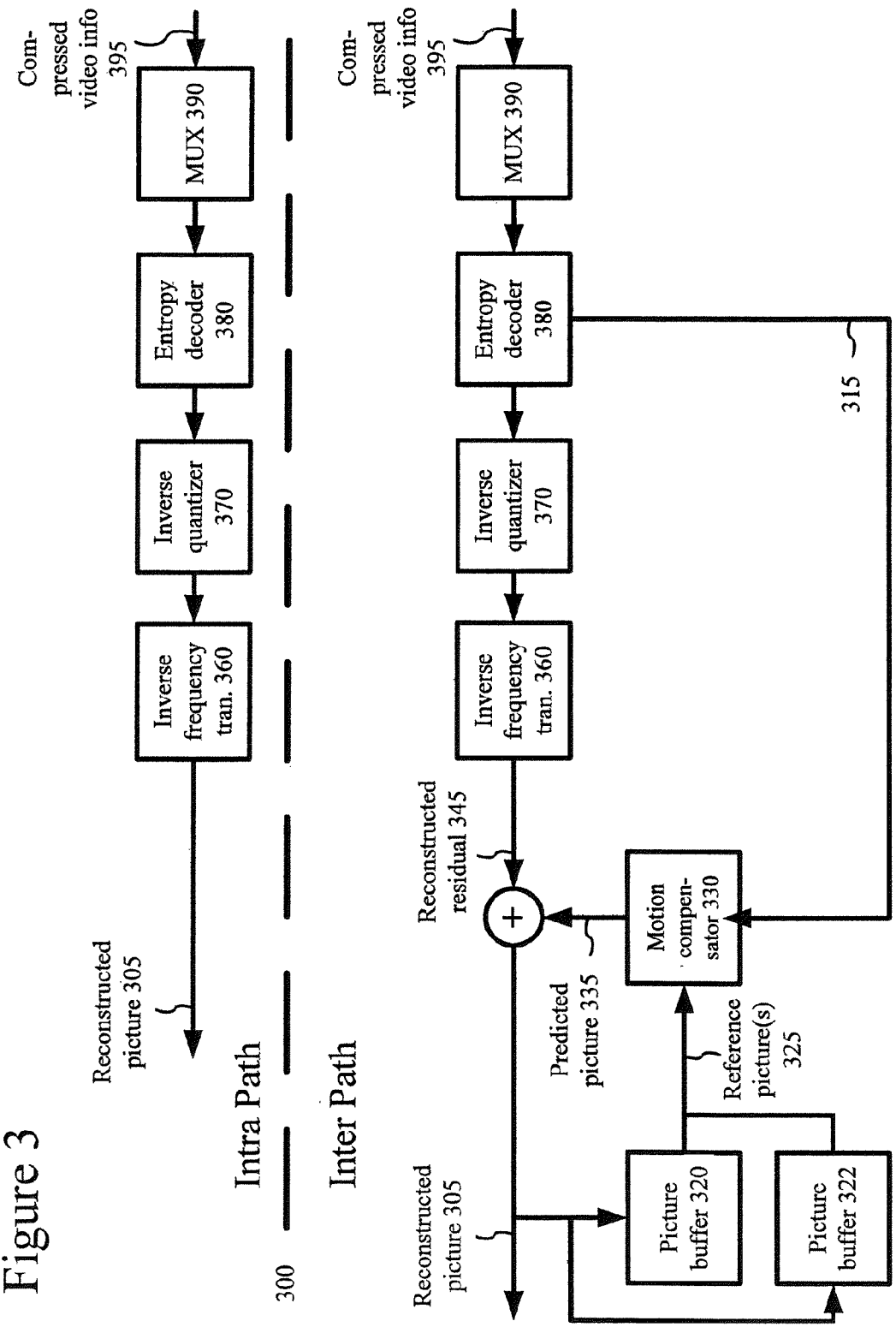
FIG. 3 is a block diagram of a generalized video decoder system in conjunction with which several described embodiments may be implemented.

FIG. 2 is a block diagram of an example video encoder 200 in conjunction with which some described embodiments may be implemented. FIG. 3 is a block diagram of a generalized video decoder 300 in conjunction with which some described embodiments may be implemented.

The relationships shown between modules within the encoder 200 and decoder 300 indicate general flows of information in the encoder and decoder; other relationships are not shown for the sake of simplicity. In particular, FIGS. 2 and 3 usually do not show side information indicating the encoder settings, modes, tables, etc. used for a video sequence, picture, slice, macroblock, block, etc. Such side information is sent in the output bitstream, typically after entropy encoding of the side information. The format of the output bitstream may vary depending on implementation.

The encoder 200 and decoder 300 process video pictures, which may be video frames, video fields or combinations of frames and fields. The bitstream syntax and semantics at the picture and macroblock levels may depend on whether frames or fields are used. There may be changes to macroblock organization and overall timing as well. The encoder 200 and decoder 300 are block-based and use a 4:2:0 macroblock format for frames, with each macroblock including four 8×8 luminance blocks (at times treated as one 16×16 macroblock)

and two 8×8 chrominance blocks. For fields, the same or a different macroblock organization and format may be used. The 8×8 blocks may be further sub-divided at different stages, e.g., at the frequency transform and entropy encoding stages. Example video frame organizations are described in more detail below. Alternatively, the encoder 200 and decoder 300 are object-based, use a different macroblock or block format, or perform operations on sets of samples of different size or configuration than 8×8 blocks and 16×16 macroblocks.

Depending on implementation and the type of compression desired, modules of the encoder or decoder can be added, omitted, split into multiple modules, combined with other modules, and/or replaced with like modules. In alternative embodiments, encoders or decoders with different modules and/or other configurations of modules perform one or more of the described techniques.

A. Video Frame Organizations

In some implementations, the encoder 200 and decoder 300 process video frames organized as follows. A frame contains lines of spatial information of a video signal. For progressive video scanning, these lines contain samples representing a snapshot of scene content sampled at the same time instant and covering the entire scene from the top to the bottom of the frame. A progressive video frame is divided into macroblocks such as the macroblock 400 shown in FIG. 4. The macroblock 400 includes four 8×8 luminance blocks (Y1 through Y4) and two 8×8 chrominance blocks that are co-located with the four luminance blocks but half resolution horizontally and vertically, following the conventional 4:2:0 macroblock format. The 8×8 blocks may be further sub-divided at different stages, e.g., at the frequency transform (e.g., 8×4, 4×8 or 4×4 DCTs) and entropy encoding stages. A progressive I-frame is an intra-coded progressive video frame, where the term "intra" refers to coding methods that do not involve prediction from the content of other previously-decoded pictures. A progressive P-frame is a progressive video frame coded using prediction from one or more other pictures at time instances that temporally differ from that of the current picture (sometimes referred to as forward prediction in some contexts), and a progressive B-frame is a progressive video frame coded using inter-frame prediction involving a (possibly weighted) averaging of multiple prediction values in some regions (sometimes referred to as bi-predictive or bi-directional prediction). Progressive P- and B-frames may include intra-coded macroblocks as well as various types of inter-frame predicted macroblocks.

Figure 5A:
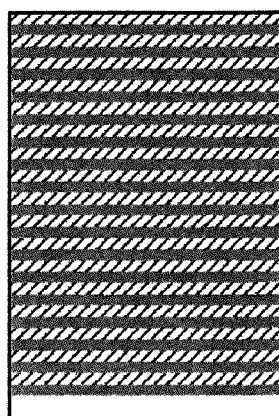
FIG. 5A is a diagram of part of an interlaced video frame, showing alternating lines of a top field and a bottom field.

Interlaced video frame scanning consists of an alternating series of two types of scans of a scene—one, referred to as the top field, comprising the even lines (lines numbered 0, 2, 4, etc.) of a frame, and the other, referred to as the bottom field, comprising the odd lines (lines numbered 1, 3, 5, etc.) of the frame. The two fields typically represent two different snapshot time instants. FIG. 5A shows part of an interlaced video frame 500, including the alternating lines of the top field and bottom field at the top left part of the interlaced video frame 500.

Figure 4:
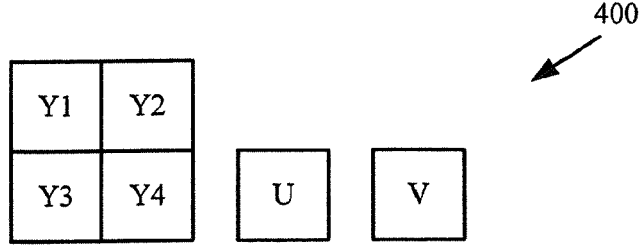
FIG. 4 is a diagram of a macroblock format used in several described embodiments.
Figure 5B:
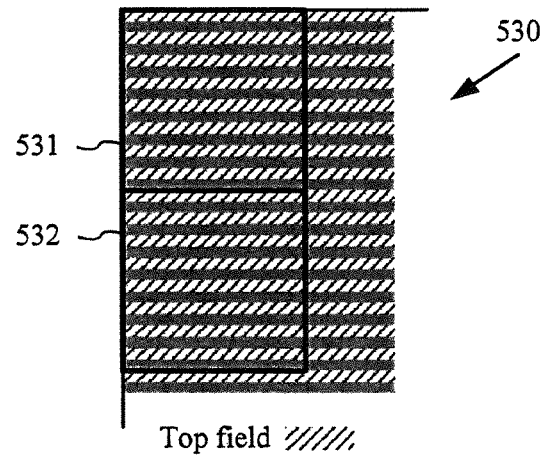
FIG. 5B is a diagram of the interlaced video frame organized for encoding/decoding as a frame.

FIG. 5B shows the interlaced video frame 500 of FIG. 5A organized for encoding/decoding as a frame 530. The interlaced video frame 500 has been partitioned into macroblocks or other such regions such as the macroblocks 531 and 532, which use a 4:2:0 format as shown in FIG. 4. In the luminance plane, each macroblock 531, 532 includes 8 lines from the top field alternating with 8 lines from the bottom field for 16 lines total, and each line is 16 samples long. (The actual organization of the picture into macroblocks or other such regions and the placement of luminance blocks and chrominance blocks within the macroblocks 531, 532 are not shown, and in fact may vary for different encoding decisions and for different video coding designs.) Within a given macroblock, the top-field information and bottom-field information may be coded jointly or separately at any of various phases.

An interlaced I-frame is an intra-coded interlaced video frame containing two fields, where each macroblock includes information for one or both fields. An interlaced P-frame is an interlaced video frame containing two fields that is coded using inter-frame prediction, where each macroblock includes information for one or both fields, as is an interlaced B-frame. Interlaced P- and B-frames may include intra-coded macroblocks as well as various types of inter-frame predicted macroblocks.

Figure 5C:
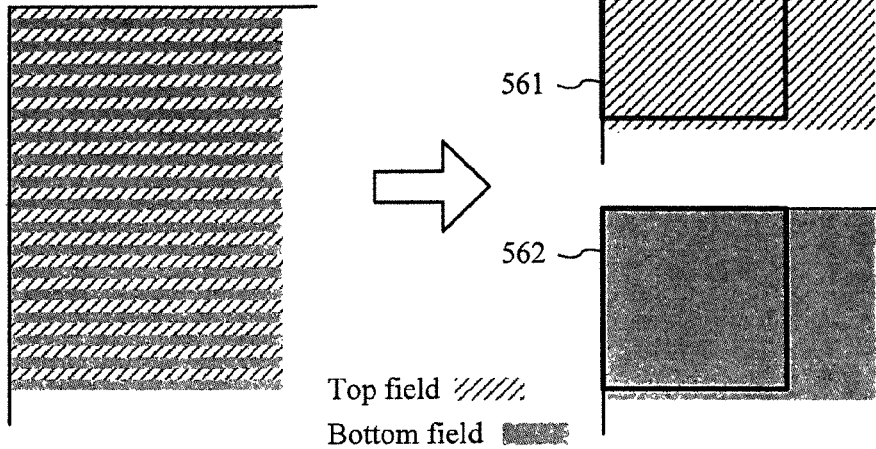
FIG. 5C is a diagram of the interlaced video frame organized for encoding/decoding as fields.

FIG. 5C shows the interlaced video frame 500 of FIG. 5A organized for encoding/decoding as fields 560. Each of the two fields of the interlaced video frame 500 is partitioned into macroblocks. The top field is partitioned into macroblocks such as the macroblock 561, and the bottom field is partitioned into macroblocks such as the macroblock 562. (Again, the macroblocks use a 4:2:0 format as shown in FIG. 4, and the organization of the picture into macroblocks or other such regions and placement of luminance blocks and chrominance blocks within the macroblocks are not shown and may vary.) In the luminance plane, the macroblock 561 includes 16 lines from the top field and the macroblock 562 includes 16 lines from the bottom field, and each line is 16 samples long.

An interlaced I-field is a single, separately represented field of an interlaced video frame. An interlaced P-field is a single, separately represented field of an interlaced video frame coded using inter-picture prediction, as is an interlaced B-field. Interlaced P- and B-fields may include intra-coded macroblocks as well as different types of inter-picture predicted macroblocks.

Interlaced video frames organized for encoding/decoding as fields may include various combinations of different field types. For example, such a frame may have the same field type (I-field, P-field, or B-field) in both the top and bottom fields or different field types in each field.

The term picture generally refers to a frame or field of source, coded or reconstructed image data. For progressive-scan video, a picture is typically a progressive video frame. For interlaced video, a picture may refer to an interlaced video frame, the top field of a frame, or the bottom field of a frame, depending on the context.

FIG. 5D shows six example spatial alignments of 4:2:0 chroma sample locations relative to luma sample locations for each field of a video frame.

Alternatively, the encoder 200 and decoder 300 are object-based, use a different macroblock format (e.g., 4:2:2 or 4:4:4) or block format, or perform operations on sets of samples of different size or configuration than 8×8 blocks and 16×16 macroblocks.

B. Video Encoder

FIG. 2 is a block diagram of an example video encoder system 200. The encoder system 200 receives a sequence of video pictures including a current picture 205 (e.g., progressive video frame, interlaced video frame, or field of an interlaced video frame), and produces compressed video information 295 as output. Particular embodiments of video encoders typically use a variation or supplemented version of the example encoder 200.

The encoder system 200 uses encoding processes for intra-coded (intra) pictures (I-pictures) and inter-picture predicted (inter) pictures (P- or B-pictures). For the sake of presentation, FIG. 2 shows a path for I-pictures through the encoder system 200 and a path for inter-picture predicted pictures. Many of the components of the encoder system 200 are used for compressing both I-pictures and inter-picture predicted pictures. The exact operations performed by those components may vary depending on the type of information being compressed.

An inter-picture predicted picture is represented in terms of a prediction (or difference) from one or more other pictures (which are typically referred to as reference pictures). A prediction residual is the difference between what was predicted and the original picture. In contrast, an I-picture is compressed without reference to other pictures. I-pictures may use spatial prediction or frequency-domain prediction (i.e., intra-picture prediction) to predict some portions of the I-picture using data from other portions of the I-picture itself. However, for the sake of brevity, such I-pictures are not referred to in this description as "predicted" pictures, so that the phrase "predicted picture" can be understood to be an inter-picture predicted picture (e.g., a P- or B-picture).

If the current picture 205 is a predicted picture, a motion estimator 210 estimates motion of macroblocks or other sets of samples of the current picture 205 with respect to one or more reference pictures, for example, the reconstructed previous picture 225 buffered in the picture store 220. A motion estimator 210 may estimate motion with respect to one or more temporally previous reference pictures and one or more temporally future reference pictures (e.g., in the case of a bi-predictive picture). Accordingly, the encoder system 200 may use the separate stores 220 and 222 for multiple reference pictures.

The motion estimator 210 may estimate motion by full-sample, ½-sample, ¼-sample, or other increments, and may switch the resolution of the motion estimation on a picture-by-picture basis or other basis. The motion estimator 210 (and compensator 230) also may switch between types of reference picture sample interpolation (e.g., between cubic convolution interpolation and bilinear interpolation) on a per-frame or other basis. The resolution of the motion estimation may be the same or different horizontally and vertically. The motion estimator 210 outputs, as side information, motion information 215 such as differential motion vector information. The encoder 200 encodes the motion information 215 by, for example, computing one or more predictors for motion vectors, computing differences between the motion vectors and predictors, and entropy coding the differences. To reconstruct a motion vector, a motion compensator 230 combines a predictor with motion vector difference information.

The motion compensator 230 applies the reconstructed motion vector to the reconstructed picture(s) 225 to form a motion-compensated prediction 235. The prediction is rarely perfect, however, and the difference between the motion-compensated prediction 235 and the original current picture 205 is the prediction residual 245. During later reconstruction of the picture, an approximation of the prediction residual 245 will be added to the motion compensated prediction 235 to obtain a reconstructed picture that is closer to the original current picture 205 than the motion-compensated prediction 235. In lossy compression, however, some information is still lost from the original current picture 205. Alternatively, a motion estimator and motion compensator apply another type of motion estimation/compensation.

A frequency transformer 260 converts the spatial domain video information into frequency domain (i.e., spectral) data. For block-based video coding, the frequency transformer 260 typically applies a discrete cosine transform (DCT), a variant of a DCT, or some other block transform to blocks of the sample data or prediction residual data, producing blocks of frequency-domain transform coefficients. Alternatively, the frequency transformer 260 applies another type of frequency transform such as a Fourier transform or uses wavelet or sub-band analysis. The frequency transformer 260 may apply an 8×8, 8×4, 4×8, 4×4 or other size frequency transform.

A quantizer 270 then quantizes the blocks of frequency-domain transform coefficients. The quantizer applies scalar quantization to the transform coefficients according to a quantization step-size that varies on a picture-by-picture basis, a macroblock basis, or some other basis, where the quantization step size is a control parameter that governs the uniformly-spaced spacing between discrete representable reconstruction points in the decoder inverse quantizer process, which may be duplicated in an encoder inverse quantizer process 276. Alternatively, the quantizer applies another type of quantization to the frequency-domain transform coefficients, for example, a scalar quantizer with non-uniform reconstruction points, a vector quantizer, or non-adaptive quantization, or directly quantizes spatial domain data in an encoder system that does not use frequency transformations. In addition to adaptive quantization, the encoder 200 may use frame dropping, adaptive filtering, or other techniques for rate control.

When a reconstructed current picture is needed for subsequent motion estimation/compensation, an inverse quantizer 276 performs inverse quantization on the quantized frequency-domain transform coefficients. An inverse frequency transformer 266 then performs the inverse of the operations of the frequency transformer 260, producing a reconstructed prediction residual approximation (for a predicted picture) or a reconstructed I-picture approximation. If the current picture 205 was an I-picture, the reconstructed I-picture approximation is taken as the reconstructed current picture approximation (not shown). If the current picture 205 was a predicted picture, the reconstructed prediction residual approximation is added to the motion-compensated prediction 235 to form the reconstructed current picture approximation. One or more of the picture stores 220, 222 buffers the reconstructed current picture approximation for use as a reference picture in motion compensated prediction of subsequent pictures. The encoder may apply a de-blocking filter or other picture refining process to the reconstructed frame to adaptively smooth discontinuities and remove other artifacts from the picture prior to storing the picture approximation into one or more picture stores 220, 222.

The entropy coder 280 compresses the output of the quantizer 270 as well as certain side information (e.g., motion information 215, quantization step size). Typical entropy coding techniques include arithmetic coding, differential coding, Huffman coding, run length coding, Lempel-Ziv coding, dictionary coding, and combinations of the above. The entropy coder 280 typically uses different coding techniques for different kinds of information (e.g., low-frequency coefficients, high-frequency coefficients, zero-frequency coefficients, different kinds of side information), and may choose from among multiple code tables within a particular coding technique.

The entropy coder 280 provides compressed video information 295 to the multiplexer ["MUX"] 290. The MUX 290 may include a buffer, and a buffer fullness level indicator may be fed back to bit rate adaptive modules for rate control. Before or after the MUX 290, the compressed video information 295 may be channel coded for transmission over the network. The channel coding may apply error detection and correction data to the compressed video information 295.

C. Video Decoder

FIG. 3 is a block diagram of an example video decoder system 300. The decoder system 300 receives information 395 for a compressed sequence of video pictures and produces output including a reconstructed picture 305 (e.g., progressive video frame, interlaced video frame, or field of an interlaced video frame). Particular embodiments of video decoders typically use a variation or supplemented version of the generalized decoder 300.

The decoder system 300 decompresses predicted pictures and I-pictures. For the sake of presentation, FIG. 3 shows a path for I-pictures through the decoder system 300 and a path for predicted pictures. Many of the components of the decoder system 300 are used for decompressing both I-pictures and predicted pictures. The exact operations performed by those components may vary depending on the type of information being decompressed.

A DEMUX 390 receives the information 395 for the compressed video sequence and makes the received information available to the entropy decoder 380. The DEMUX 390 may include a jitter buffer and other buffers as well. Before or within the DEMUX 390, the compressed video information may be channel decoded and processed for error detection and correction.

The entropy decoder 380 entropy decodes entropy-coded quantized data as well as entropy-coded side information (e.g., motion information 315, quantization step size), typically applying the inverse of the entropy encoding performed in the encoder. Entropy decoding techniques include arithmetic decoding, differential decoding, Huffman decoding, run length decoding, Lempel-Ziv decoding, dictionary decoding, and combinations of the above. The entropy decoder 380 typically uses different decoding techniques for different kinds of information (e.g., low-frequency coefficients, high-frequency coefficients, zero-frequency coefficients, different kinds of side information), and may choose from among multiple code tables within a particular decoding technique.

The decoder 300 decodes the motion information 315 by, for example, computing one or more predictors for motion vectors, entropy decoding motion vector differences (at entropy decoder 380), and combining decoded motion vector differences with predictors to reconstruct motion vectors.

A motion compensator 330 applies motion information 315 to one or more reference pictures 325 to form a prediction 335 of the picture 305 being reconstructed. For example, the motion compensator 330 uses one or more macroblock motion vectors to find blocks of samples or to interpolate fractional positions between samples in the reference picture(s) 325. One or more picture stores (e.g., picture store 320, 322) store previous reconstructed pictures for use as reference pictures. Typically, B-pictures have more than one reference picture (e.g., at least one temporally previous reference picture and at least one temporally future reference picture). Accordingly, the decoder system 300 may use separate picture stores 320 and 322 for multiple reference pictures. The motion compensator 330 may compensate for motion at full-sample, ½ sample, ¼ sample, or other increments, and may switch the resolution of the motion compensation on a picture-by-picture basis or other basis. The motion compensator 330 also may switch between types of reference picture sample interpolation (e.g., between cubic convolution interpolation and bilinear interpolation) on a per-frame or other basis. The resolution of the motion compensation may be the same or different horizontally and vertically. Alternatively, a motion compensator applies another type of motion compensation. The prediction by the motion compensator is rarely perfect, so the decoder 300 also reconstructs prediction residuals.

An inverse quantizer 370 inverse quantizes entropy-decoded data. Typically, the inverse quantizer applies uniform scalar inverse quantization to the entropy-decoded data with a reconstruction step-size that varies on a picture-by-picture basis, a macroblock basis, or some other basis. Alternatively, the inverse quantizer applies another type of inverse quantization to the data, for example, a non-uniform, vector, or non-adaptive inverse quantization, or directly inverse quantizes spatial domain data in a decoder system that does not use inverse frequency transformations.

An inverse frequency transformer 360 converts the inverse quantized frequency domain transform coefficients into spatial domain video information. For block-based video pictures, the inverse frequency transformer 360 applies an inverse DCT ["IDCT"], a variant of MCI, or some other inverse block transform to blocks of the frequency transform coefficients, producing sample data or inter-picture prediction residual data for I-pictures or predicted pictures, respectively. Alternatively, the inverse frequency transformer 360 applies another type of inverse frequency transform such as an inverse Fourier transform or uses wavelet or sub-band synthesis. The inverse frequency transformer 360 may apply an 8×8, 8×4, 4×8, 4×4, or other size inverse frequency transform.

For a predicted picture, the decoder 300 combines the reconstructed prediction residual 345 with the motion compensated prediction 335 to form the reconstructed picture 305. When the decoder needs a reconstructed picture 305 for subsequent motion compensation, one or more of the picture stores (e.g., picture store 320) buffers the reconstructed picture 305 for use in predicting the next picture. In some embodiments, the decoder 300 applies a de-blocking filter or other picture refining process to the reconstructed picture to adaptively smooth discontinuities and remove other artifacts from the picture prior to storing the reconstructed picture 305 into one or more of the picture stores (e.g., picture store 320) or prior to displaying the decoded picture during decoded video play-out.

III. General Overview of Multi-Resolution Encoding and Decoding

Video can be encoded (and decoded) at different resolutions. For the purposes of this description, multi-resolution encoding and decoding can be described as frame-based coding and decoding (e.g., reference picture resampling) or layered (sometimes referred to as spatial scalable) coding and decoding. Multi-resolution encoding and decoding could also involve interlaced video and field-based encoding and decoding and switching between frame-based and field-based encoding and decoding on a resolution-specific basis or on some other basis. However, frame coding of progressive video is discussed in this overview for purposes of simplifying the concept description.

A. Frame-Based Multi-Resolution Encoding and Decoding

In frame-based multi-resolution coding, an encoder encodes input pictures at different resolutions. The encoder chooses the spatial resolution for pictures on a picture-by-picture basis or on some other basis. For example, in reference picture resampling, a reference picture can be resampled if it is encoded at a different resolution from that of the picture being encoded. The term resampling is used to describe increasing (upsampling) or decreasing (downsampling) the number of samples used to represent a picture area or some other section of a sampled signal. The number of samples per unit area or per signal section is referred to as the resolution of the sampling.

Spatial resolution can be chosen based on, for example, an decrease/increase in available bit rate, decrease/increase in quantization step size, decrease/increase in the amount of motion in the input video content, other properties of the video content (e.g., presence of strong edges, text, or other content that may be significantly distorted at lower resolutions), or some other basis. Spatial resolution can be varied in vertical, horizontal, or both vertical and horizontal dimensions. Horizontal resolution may be the same as or different than vertical resolution. A decoder decodes encoded frames using complementary techniques.

Once the encoder has chosen a spatial resolution for a current picture or area within a current picture, the encoder re-samples the original picture to the desired resolution before coding it. The encoder can then signal the choice of spatial resolution to the decoder.

Figure 6:
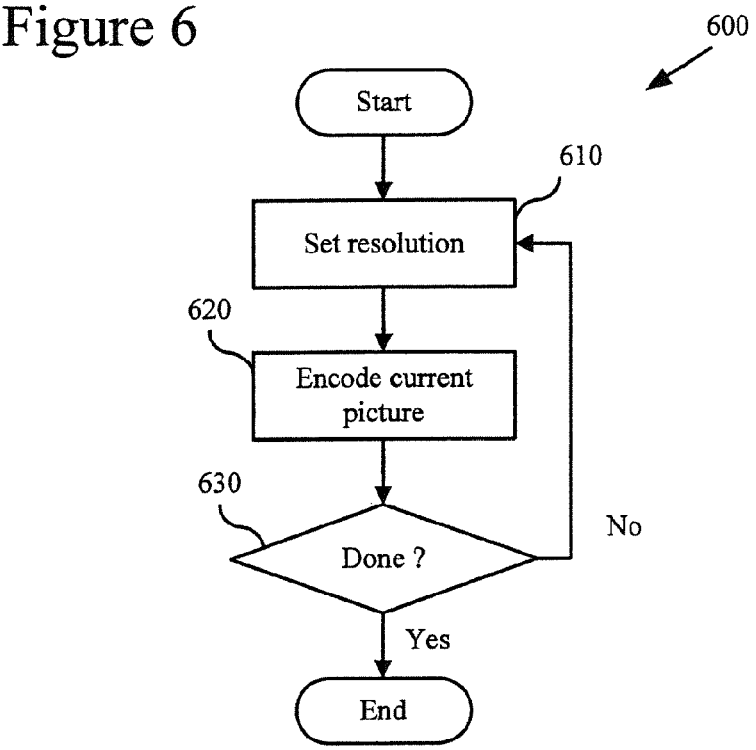
FIG. 6 is a flowchart showing a generalized technique for multi-resolution encoding of video.

FIG. 6 shows a technique (600) for frame-based multi-resolution encoding of pictures. An encoder, such as encoder 200 in FIG. 2 sets a resolution (610) for a picture. For example, the encoder considers the criteria listed above or other criteria. The encoder then encodes the picture (620) at that resolution. If the encoding of all pictures that are to be encoded is done (630), the encoder exits. If not, the encoder sets a resolution (610) for the next picture and continues encoding. Alternatively, the encoder sets resolutions at some level other than picture level, such as setting the resolution differently for different parts of picture or making a resolution selection for a group or sequence of pictures.

Figure 8:
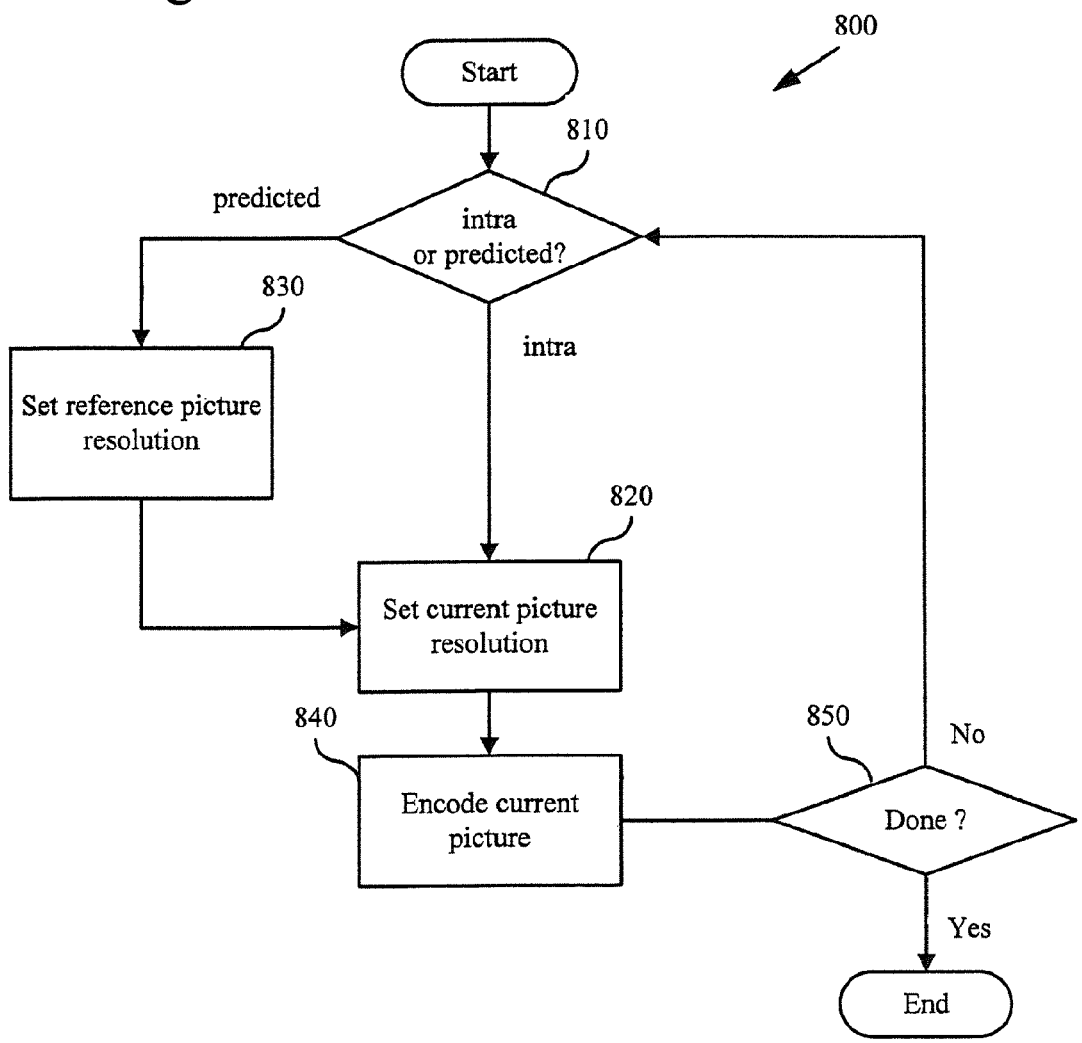
FIG. 8 is a flowchart showing a technique for multi-resolution encoding of intra pictures and inter-picture predicted pictures.

The encoder may encode predicted pictures as well as intra pictures. FIG. 8 shows a technique (800) for frame-based multi-resolution encoding of intra pictures and inter-picture predicted pictures. First, the encoder checks at 810 whether the current picture to be encoded is an intra picture or a predicted picture. If the current picture is an intra picture, the encoder sets the resolution for the current picture at 820. If the picture is a predicted picture, the encoder sets the resolution for the reference picture at 830 before setting the resolution for the current picture. After setting the resolution for the current picture, the encoder encodes the current picture (840) at that resolution. Setting the resolution for a picture (whether a current source picture or a stored reference picture) may involve resampling the picture to match the selected resolution and may involve encoding a signal to indicate the selected resolution to the decoder. If the encoding of all pictures that are to be encoded is done (850), the encoder exits. If not, the encoder continues encoding additional pictures. Alternatively, the encoder treats predicted pictures in a different way.

A decoder decodes the encoded picture, and, if necessary, resamples the picture before display. Like the resolution of the encoded picture, the resolution of the decoded picture can be adjusted in many different ways. For example, the resolution of the decoded picture can be adjusted to fit the resolution of an output display device or of a region of an output display device (for example, for "picture-in-picture" or PC desktop window display).

Figure 7:
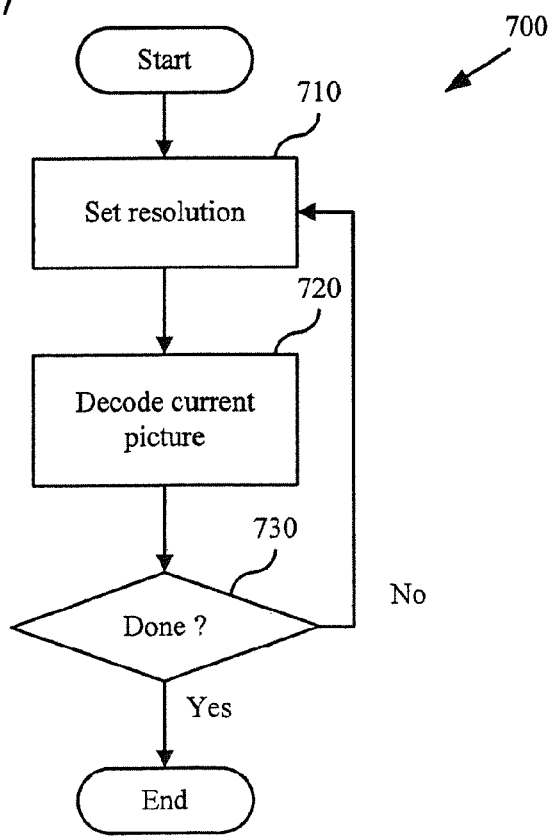
FIG. 7 is a flowchart showing a generalized technique for multi-resolution decoding of video.

FIG. 7 shows a technique (700) for frame-based multi-resolution decoding of pictures. A decoder, such as decoder 300 in FIG. 3, sets a resolution (at 710) for a picture. For example, the decoder gets resolution information from the encoder. The decoder then decodes the picture (720) at that resolution. If the decoding of all pictures that are to be decoded is done (730), the decoder exits. If not, the decoder sets a resolution (710) for the next picture and continues decoding. Alternatively, the decoder sets resolutions at some level other than picture level.

Figure 9:
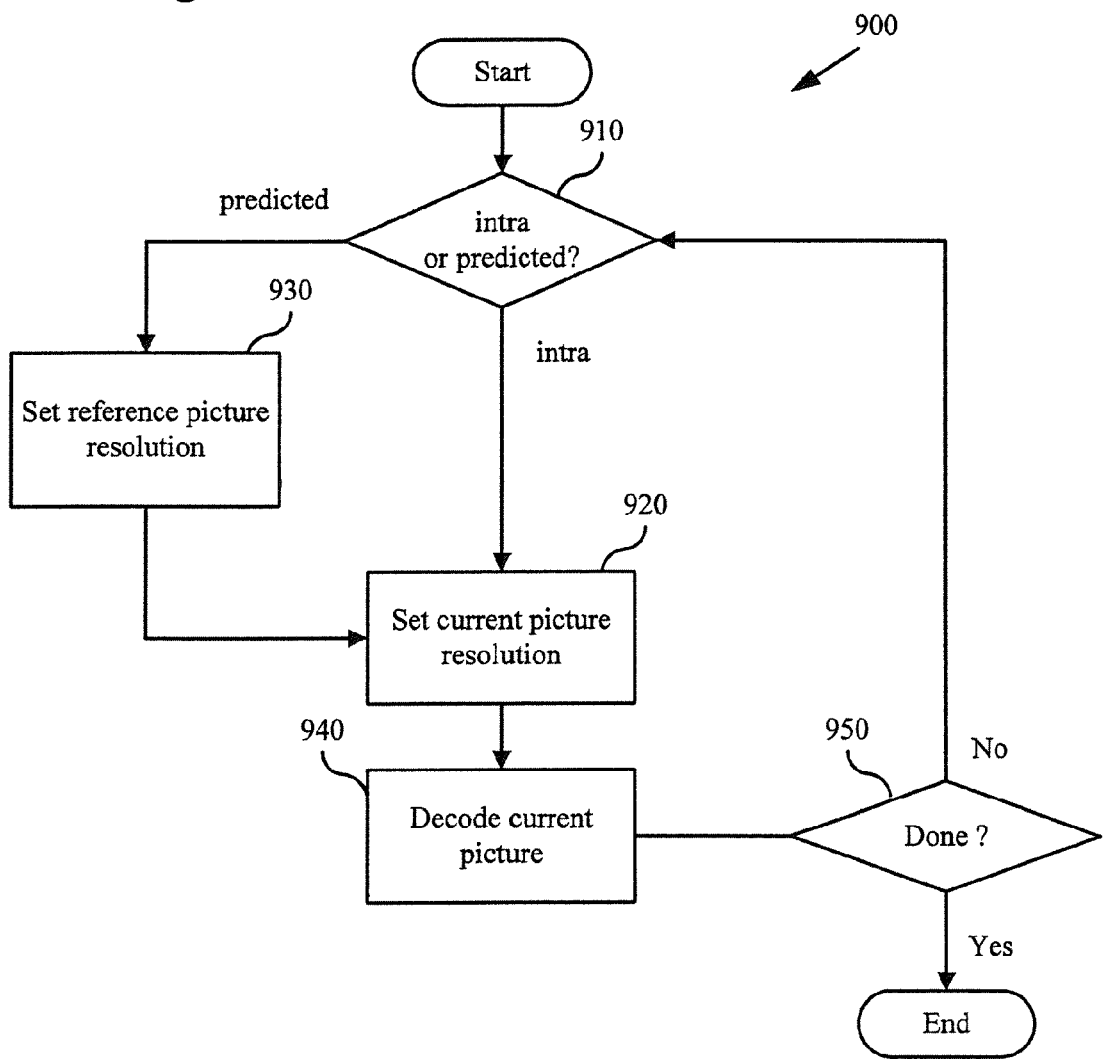
FIG. 9 is a flowchart showing a technique for multi-resolution decoding of intra pictures and inter-picture predicted pictures.

The decoder may decode predicted pictures as well as intra pictures. FIG. 9 shows a technique (900) for frame-based multi-resolution decoding of intra pictures and predicted pictures.

First, the decoder checks whether the current frame to be decoded is an intra picture or a predicted picture (910). If the current picture is an intra picture, the decoder sets the resolution for the current picture (920). If the picture is a predicted picture, the decoder sets the resolution for the reference picture (930) before setting the resolution for the current picture (920). Setting the resolution of the reference picture may involve resampling the stored reference picture to match the selected resolution. After setting the resolution for the current picture (920), the decoder decodes the current picture (940) at that resolution. If the decoding of all pictures that are to be decoded is done (950), the decoder exits. If not, the decoder continues decoding.

The decoder typically decodes pictures at the same resolutions used in the encoder. Alternatively, the decoder decodes pictures at different resolutions, such as when the resolutions available to the decoder are not exactly the same as those used in the encoder.

B. Layered Multi-Resolution Encoding and Decoding

In layered multi-resolution coding, an encoder encodes video in layers, with each layer having information for decoding the video at a different resolution. In this way, the encoder encodes at least some individual pictures in the video at more than one resolution. A decoder can then decode the video at one or more resolutions by processing different combinations of layers. For example, a first layer (sometimes referred to as a base layer) contains information for decoding video at a lower resolution, while one or more other layers (sometimes referred to as enhancement layers) contain information for decoding the video at higher resolutions.

The base layer may be designed to itself be an independently decodable bitstream. Thus, in such a design, a decoder that decodes only the base layer will produce a valid decoded bitstream at the lower resolution of the base layer. Proper decoding of higher-resolution pictures using an enhancement layer may require also decoding some or all of the encoded base layer data and possibly of one or more enhancement layers. A decoder that decodes the base layer and one or more other higher-resolution layers will be able to produce higher resolution content than a decoder that decodes only the base layer. Two, three or more layers may be used to allow for two, three or more different resolutions. Alternatively, a higher resolution layer may itself also be an independently decodable bitstream. (Such a design is often referred to as a simulcast multi-resolution encoding approach.)

FIG. 10 shows a technique (1000) for encoding bitstream layers to allow decoding at different resolutions. An encoder such as encoder 200 in FIG. 2 takes full-resolution video information as input (1010). The encoder downsamples the full-resolution video information (1020) and encodes the base layer using the downsampled information (1030). The encoder encodes one or more higher-resolution layers using the base layer and higher-resolution video information (1040). A higher-resolution layer can be a layer that allows decoding at full resolution, or a layer that allows decoding at some intermediate resolution.

The encoder then outputs a layered bitstream comprising two more of the encoded layers. Alternatively, the encoding of the higher-resolution layer (1040) may not use base layer information and may thus enable the independent decoding of the higher-resolution layer data for a simulcast multi-resolution encoding approach.

The encoder can accomplish multi-resolution layer encoding in several ways following the basic outline shown in FIG. 10. For more information, see, e.g., U.S. Pat. No. 6,510,177, or the MPEG-2 standard or other video standards.

FIG. 11 shows a technique (1100) for decoding bitstream layers to allow decoding video at different resolutions. A decoder such as decoder 300 in FIG. 3 takes a layered bitstream as input (1110). The layers include a lower-resolution layer (base layer) and one or more layers comprising higher-resolution information. The higher-resolution layers need not contain independently encoded pictures; typically, higher-resolution layers include residual information that describes differences between higher- and lower-resolution versions of pictures. The decoder decodes the base layer (1120) and, if higher-resolution decoding is desired, the decoder upsamples the decoded base layer pictures (1130) to the desired resolution. The decoder decodes one or more higher-resolution layers (1140) and combines the decoded higher-resolution information with the upsampled, decoded base layer pictures to form higher-resolution pictures (1150). Depending on the desired resolution level, the higher-resolution pictures may be full-resolution pictures or intermediate-resolution pictures. For more information, see, e.g., U.S. Pat. No. 6,510,177, or the MPEG-2 standard or other video standards.

The decoder typically decodes pictures at one of the resolutions used in the encoder. Alternatively, the resolutions available to the decoder are not exactly the same as those used in the encoder.

IV. Resampling Filters for Scalable Video Coding and Decoding

This section describes techniques and tools for scalable video coding and decoding. Although some described techniques and tools are described in a layered (or spatial scalable) context, some described techniques and tools can also be used in a frame-based (or reference picture sampling) context, or in some other context that involves resampling filters. Further, although some described techniques and tools are described in the context of resampling pictures, some described techniques and tools can also be used for resampling residual or difference signals that result from prediction of higher resolution signals.

Scalable video coding (SVC) is a type of digital video coding that allows a subset of a larger bitstream to be decoded to produce decoded pictures with a quality that is acceptable for some applications (although such picture quality would be lower than the quality produced by decoding an entire higher-bit-rate bitstream). One well-known type of SVC is referred to as spatial scalability, or resolution scalability. In a spatial SVC design, the encoding process (or a pre-processing function to be performed prior to the encoding process, depending on the exact definition of the scope of the encoding process) typically includes downsampling the video to a lower resolution and encoding that lower-resolution video for enabling a lower-resolution decoding process, and upsampling of the lower-resolution decoded pictures for use as a prediction of the values of the samples in the pictures of the higher-resolution video. The decoding process for the higher-resolution video then includes decoding the lower-resolution video (or some part of it) and using that upsampled video as a prediction of the value of the samples in the pictures of the higher-resolution video. Such designs require the use of resampling falters. In particular, codec designs include the use of upsampling filters in both decoders and encoders and the use of downsampling filters in encoders or encoding pre-processors. We especially focus on the upsampling filters used in such designs. Typically, the upsampling process is designed to be identical in encoders and decoders, in order to prevent a phenomenon known as drift, which is an accumulation of error caused by the use of differing predictions of the same signal during encoding and decoding.

One drawback of some spatial SVC designs is the use of low-quality filters (e.g., two-tap bilinear filters) in the decoding process. The use of higher quality filters would be beneficial to video quality.

Spatial SVC may include resampling filters that enable a high degree of flexibility in the resampling ratio of the filter. However, this may require a large number of particular filter designs for each different "phase" of such a filter to be developed and the "tap" values of these filters to be stored in implementations of encoders and decoders.

Furthermore, it can be beneficial to video quality to allow an encoder to control the amount of blurriness of the resampling filters used for spatial SVC. Thus, for each "phase" of resampling to be designed for upsampling or downsampling, it may be beneficial to have several different filters to choose from, depending on the desired degree of blurriness to be introduced in the process. The selection of the degree of blurriness to be performed during upsampling may be sent from an encoder to a decoder as information conveyed for use in the decoding process. This extra flexibility further complicates the design, as it greatly increases the number of necessary tap values that may need to be stored in an encoder or decoder.

A unified design could be used to specify a variety of resampling filters with various phases and various degrees of blurriness. One possible solution is the use of the Mitchell-Netravali filter design method. Straightforward application of the Mitchell-Netravali filter design method to these problems may require excess computational resources in the form of an excessive dynamic range of possible values for quantities that are to be computed in the encoder or decoder. For example, one such design might require the use of 45-bit arithmetic processing, rather than the 16-bit or 32-bit processing elements normally used in general-purpose CPUs and DSPs. To address this issue, we provide some design refinements.

A typical SVC design requires a normative upsampling filter for spatial scalability. To support arbitrary resampling ratios (a feature known as extended spatial scalability), an upsampling filter design is described that incorporates a great deal of flexibility regarding resampling ratios. Another key aspect is the relative alignment of luma and chroma. Since a variety of alignment structures (see, e.g., H.261/MPEG-1 vs. MPEG-2 alignment for 4:2:0 chroma, and H.264/MPEG-4 AVC) are found in single-layer approaches, described techniques and tools support a flexible variety of alignments, with an easy way for the encoder to indicate to the decoder how to apply the filtering appropriately.

Described techniques and tools comprise upsampling filters capable of high-quality upsampling and good anti-aliasing. In particular, described techniques and tools have quality beyond that provided by previous bilinear filter designs for spatial scalability. Described techniques and tools have high-quality upsampling filters that are visually pleasing as well as providing good signal-processing frequency behavior. Described techniques and tools comprise a filter design that is simple to specify and does not require large memory storage tables to hold tap values, and the filtering operations themselves are computationally simple to operate. For example, described techniques and tools have a filter that is not excessively lengthy and does not require excessive mathematical precision or overly complex mathematical functions.

This section describes designs having one or more of the following features:
flexibility of luma/chroma phase alignment;
flexibility of resampling ratio;
flexibility of frequency characteristics;
high visual quality;

not too few and not too many filter taps (e.g., between 4 and 6);

simple to specify;

simple to operate (e.g., using practical word-length arithmetic).

A. Mitchell-Netravali Upsampling Filters

Described techniques and tools take a separable filtering approach—therefore, the following discussion will focus primarily on processing of a one-dimensional signal, as the two-dimensional case is a simple separable application of the one-dimensional case. It first proposes a two-parameter set of filters based on the conceptually-continuous impulse response h(x) given by:

$$h(x) = \frac{1}{6} * \begin{cases} (12-9b-6c)|x|^3 - (18-12b-6c)|x|^2 + (6-2b) & |x| < 1 \\ -(b+6c)|x|^3 + (6b+30c)|x|^2 - (12b+48c)|x| + (8b+24c) & 1 \leq |x| < 2 \\ 0 & \text{otherwise,} \end{cases} \quad (1)$$

where b and c are the two parameters. For a relative phase offset position 0≦x<1, this kernel produces a 4-tap finite impulse response (FIR) filter with tap values given by the following matrix equation:

$$\frac{1}{6} * [1 \; x \; x^2 \; x^3] * \begin{bmatrix} b & 6-2b & b & 0 \\ -(3b+6c) & 0 & 3b+6c & 0 \\ 3b+12c & -18+12b+6c & 18-15b-12c & -6c \\ -(b+6c) & 12-9b-6c & -(12-9b-6c) & b+6c \end{bmatrix} \quad (2)$$

Actually, it is sufficient to consider only the range of x from 0 to ½, since the FIR filter kernel for x is simply the FIR filter kernel for 1−x in reverse order.

This design has a number of interesting and useful properties. Here are some of them:

No trigonometric functions, transcendental functions or irrational-number processing is needed to compute the filter tap values. In fact, tap values for such a filter can be directly computed with only a few simple operations. They do not need to be stored for the various possible values of the parameters and phases that are to be used; they can simply be computed when needed. (So, to standardize the use of such filters, only a few formulas are needed—no huge tables of numbers or standardized attempts to approximate functions like cosines or Bessel functions are needed.)

The resulting filter has 4 taps. This is a very practical number.

The filter has only a single sidelobe on each side of the main lobe. It thus will not produce excessive ringing artifacts.

The filter has a smooth impulse response. It value and its first derivative are both continuous.

It has unity gain DC response, meaning that there is no overall brightness amplification or attenuation in the information being upsampled.

Members of this family of filter include relatively good approximations of well-known good filters such as the "Lanczos-2" design and the "Catmull-Rom" design.

Furthermore, described techniques and tools include a particular relationship between the two parameters for the selection of visually-pleasing filters. That relationship can be expressed as follows:

$$c = \frac{1}{2}(1-b) \quad (3)$$

This reduces the degrees of freedom to a single bandwidth control parameter b. This parameter controls the degree of extra blurriness introduced by the filter. Note that the member of this family associated with the value b=0 is the excellent and well-known Catmull-Rom upsampling filter (also known as a Keys "cubic convolution" interpolation filter).

The Catmull-Rom upsampling filter has a number of good properties of its own, in addition to the basic advantages found for all members of the Mitchell-Netravali filter family:

It is an "interpolating" filter—i.e., for phase values of x=0 and x=1, the filter has a single non-zero tap equal to 1. In other words, an upsampled signal will pass exactly through the values of the input samples at the edges of each upsampled curve segment.

If the set of input samples forms a parabola (or a straight line, or a static value), the output points will lie exactly on the parabolic curve (or straight line or static value).

In fact, in some ways, the Catmull-Rom upsampler can be considered the best upsampling filter of this length for these reasons—although introducing some extra blurring (increasing b) may sometimes be more visually pleasing. Also, introducing some extra blurring can help blur out low-bit-rate compression artifacts and thus act more like a Wiener filter (a well-known filter used for noise filtering) estimator of the true upsampled picture.

Simple substitution of Equation (3) into Equation (2) results in the following tap values:

$$\frac{1}{6} * [1 \; x \; x^2 \; x^3] * \begin{bmatrix} b & 6-2b & b & 0 \\ -3 & 0 & 3 & 0 \\ 6-3b & -15+9b & 12-9b & -3+3b \\ -(3-2b) & 9-6b & -(9-6b) & 3-2b \end{bmatrix} \quad (4)$$

It has been reported that, based on subjective tests with 9 expert viewers and over 500 samples:

a usable range is reported as 0≦b≦⅝;

0≦b≦½ is categorized as visually "satisfactory", with b=⅓ reported as visually pleasing;

b>½ is categorized as "blurry," with b=⅔ reported as excessively blurry

B. Integerization of the Bandwidth Control Parameter

The division by 6 in the Equation (4) may not be desirable. It may be desirable instead to integerize the bandwidth control parameter and filter tap values, as infinite precision is impractical as part of a decoder design. Consider a substitution using a new integer-valued variable a defined as follows:

$$a = (b/6)*2^S \quad (5),$$

where S is an integer shift factor and a is an unsigned integer acting as an integerized bandwidth control parameter. The parameter a can be encoded as a syntax element by the encoder at the video sequence level in a bitstream. For example, the parameter a can be encoded explicitly with a variable-length or fixed-length code, jointly coded with other information, or signaled explicitly. Alternatively, the parameter a is signaled at some other level in a bitstream.

The integerization results in integerized tap values of $$[1 \ x \ x^2 \ x^3] * \begin{bmatrix} a & 2^S - 2a & a & 0 \\ -2^{S-1} & 0 & 2^{S-1} & 0 \\ 2^S - 3a & -5*2^{S-1} + 9a & 2^{S+1} - 9a & -2^{S-1} + 3a \\ -(2^{S-1} - 2a) & 3*2^{S-1} - 6a & -(3*2^{S-1} - 6a) & 2^{S-1} - 2a \end{bmatrix}$$

The result would then need to be scaled down by S positions in binary arithmetic processing.

If a has a range of 0 to M, then b has a range from 0 to $6*M/2^S$. Some possible useful choices for M include the following:

M=$2^{(S-2)}$−1, resulting in a range of b from 0 to $3/2$-$6/2^S$.

M=Ceil($2^S/6$), which returns the smallest integer greater than or equal to $2^S/6$, resulting in range of b from 0 to slightly more than 1.

M=$2^{(S-3)}$−1, resulting in an approximate range of b from 0 to $3/4$-$6/2^S$.

These choices for M are large enough cover most useful cases, with the first choice (M=$2^{(S-2)}$−1) being the larger of the three choices. A useful range for S is between 6 and 8. For example, consider S=7 and M=$2^{(S-2)}$−1, i.e., M=31. Alternatively, other values of M and S can be used.

C. Integerization of the Fractional-Sample Positioning

Next we consider the granularity of the value of x. For practicality, we should approximate x as well. For example, we can define an integer i such that:

$$x = i \div 2^F \quad (7)$$

where F represents a supported fractional-sample position precision. For an example of a sufficiently-accurate resampling operation, consider F≧4 (one-sixteenth or greater sample positioning precision). This results in the following integerized filter tap values:

$$[1 \ i \ i^2 \ i^3] * \begin{bmatrix} a*2^{3F} & (2^S - 2a)*2^{3F} & a*2^{3F} & 0 \\ -2^{2F+S-1} & 0 & 2^{2F+S-1} & 0 \\ (2^S - 3a)*2^F & (-5*2^{S-1} + 9a)*2^F & (2^{S+1} - 9a)*2^F & (-2^{S-1} + 3a)*2^F \\ -(2^{S-1} - 2a) & 3*2^{S-1} - 6a & -(3*2^{S-1} - 6a) & 2^{S-1} - 2a \end{bmatrix} \quad (8)$$

For example, consider F=4. The result would then need to be scaled down by 3F+S positions.

Note that every entry in the matrix above contains a factor of two in common (assuming that S is greater than 1). Thus we can instead formulate the tap values as follows:

$$[1 \ i \ i^2 \ i^3] * \begin{bmatrix} a*2^{3F-1} & (2^{S-1} - a)*2^{3F} & a*2^{3F-1} & 0 \\ -2^{2F+S-2} & 0 & 2^{2F+S-2} & 0 \\ (2^S - 3a)*2^{F-1} & (-5*2^{S-1} + 9a)*2^{F-1} & (2^{S+1} - 9a)*2^{F-1} & (-2^{S-1} + 3a)*2^{F-1} \\ -(2^{S-2} - a) & 3*(2^{S-2} - a) & -3*(2^{S-2} - a) & 2^{S-2} - a \end{bmatrix}, \quad (9)$$

where each of the tap values have been divided by 2. The result then would need to be scaled down by only 3F+S−1 positions.

For the down-scaling, we define the function RoundingRightShift(p, R) as the output of a right shift of R bits (with rounding) computed for input value p, computed as follows:

$$RoundingRightShift(p, R) = \begin{cases} (p + 2^{R-1}) >> R & \text{for } R = 2, 3, 4, \ldots \\ (p) >> R & \text{for } R = 0 \text{ or } 1 \end{cases} \quad (10)$$

where the notation ">>" refers to a binary arithmetic right shift operator using two's complement binary arithmetic. Alternatively, rounding right shifting is performed differently.

Some example applications for rounding right shifting are provided below.

D. Dynamic Range Consideration

If we filter pictures with N bits of sample bit depth and do so two-dimensionally before performing any rounding, we will need 2*(3F+S−1)+N+1 bits of dynamic range in the accumulator prior to down-shifting the result by 2*(3F+S−1) positions and clipping the output to an N bit range. For example, if we have F=4, S=7 and N=8, we may need to use a 45-bit accumulator to compute the filtered result.

We describe some approaches to mitigating this problem in the following subsections. These approaches can be used separately or in combination with each other. It should be understood that variations of the described dynamic range mitigation approaches are possible based on the descriptions herein.

1. First Example Dynamic Range Mitigation Approach

Consider an example where horizontal filtering is performed first, followed by vertical filtering. Consider a maximum word length of W bits for any point in the two-dimensional processing pipeline. In a first dynamic range mitigation approach, to accomplish the filtering we use a rounding right shift of $R_H$ bits at the output of the first (horizontal) stage of the process and a rounding right shift of $R_V$ bits at the output of the second (vertical) stage of the process.

We thus compute the following:

$$2*(3F+S-1)+N+1-R_H=W \quad (11),$$

and therefore $$R_H=2*(3F+S-1)+N+1-W \quad (12).$$

Then the right shift for the second (vertical) stage can be computed from $$R_H+R_V=2*(3F+S-1) \quad (13),$$

and therefore $$R_V=2*(3F+S-1)-R_H. \quad (14).$$

For example, for F=4 and S=7 and N=8 and W=32, we obtain $R_H$=13 and $R_V$=23. Thus, instead of 45 bits of dynamic range, with rounding right shifts the dynamic range is reduced to 32 bits. Right shifts of different numbers of bits can be used for different values of W.

2. Second Example Dynamic Range Mitigation Approach

A second dynamic range mitigation approach involves reducing the precision of the tap values rather than reducing the precision of the phase positioning (i.e., reducing F), reducing the granularity of the filter bandwidth adjustment parameter (i.e., reducing S) or reducing the precision of the output of the first stage (i.e., increasing $R_H$).

We denote the four integer tap values produced by Equation (9) as $[t_{-1}, t_0, t_1, t_2]$. Note that the sum of the four filter tap values will be equal to $2^{3F+S-1}$, i.e., $$t_{-1}+t_0+t_1+t_2=2^{3F+S-1} \quad (15).$$

This is an important property of this example dynamic range mitigation approach because whenever all four input samples have the same value, the output will have that same value.

Using the example definition of rounding right shifting found in Equation (10), and given a right shift quantity R, for the tap values, we define the following:

$u_{-1}$=RoundingRightShift($t_{-1}$, $R_t$);
$u_1$=RoundingRightShift($t_1$, $R_t$);
$u_2$=RoundingRightShift($t_2$, $R_t$);

$$u_0=2^{3F+S-1}-u_{-1}-u_1-u_2.$$

We then perform the filtering with tap values $[u_{-1}, u_0, u_1, u_2]$ rather than $[t_{-1}, t_0, t_1, t_2]$. Each increase of 1 in the value of $R_t$ represents one less bit of dynamic range necessary in the arithmetic accumulator, and one less bit of right-shifting to be performed in subsequent stages of processing.

3. Third Example Dynamic Range Mitigation Approach

One previous design uses a trick that is similar in concept but differs from the first example dynamic range mitigation approach in that it makes the amount of right-shifting after the first stage of the process a function of the value of the phase positioning variable i.

We can recognize that the filter tap values shown in Equation (9) will contain K zero-valued LSBs when the value of i is an integer multiple of $2^K$. Thus, if the second stage of the filtering process uses a phase positioning variable i that is an integer multiple of $2^K$, we can right-shift the tap values of the second stage by K bits and decrease the amount of right shifting for the first stage by K bits.

This might get rather difficult to keep track of when operating a generalized resampling factor. However, when performing simple resampling factors of 2:1 or other simple factors, it is easy to recognize that all phases in use for the second stage of the filtering process contain the same multiple of $2^K$, allowing this approach to be applied in these special cases.

V. Position Calculation Techniques and Tools

Techniques and tools for computing positioning information for spatial SVC are described.

Some techniques and tools are directed to how to focus on a word length B and optimize the precision of the computation within the constraint of that word length. Instead of just selecting the precision and requiring some necessary word length, applying the new method will result in higher precision in a real implementation and will broaden the range of effective application of the technique, because it uses all of the available word length to maximize the accuracy within that constraint.

Some techniques and tools are directed to a) offsetting the origin of the coordinate system and b) using unsigned integers rather than signed integers in order to achieve a better trade-off between precision and word length/dynamic range. A minor increase in computations is needed to add the origin offset term to each calculated position.

Some techniques and tools are directed to breaking the computation of different sections of the string of samples to be produced into different stages of processing, wherein the origin of the coordinate system is changed at the start of each stage. Again it provides a better trade-off between precision and word length/dynamic range with another minor increase in computational requirements (since certain extra computations are performed at the start of each stage). If the technique is taken to its logical extreme, the need for multiplication operations can be eliminated and the trade-off between precision and word length/dynamic range can be further improved. However, certain extra operations would need to be performed for every sample (since the extra computation needed for "each stage" becomes needed for every sample when every stage contains only one sample).

As a general theme, designs are described for the position calculation part of the processing to achieve desirable trade-offs between precision of the computed results, word length/dynamic range of the processing elements, and the number and type of mathematical operations involved in the processing (e.g., shift, addition and multiplication operations).

For example, described techniques and tools allow flexible precision calculations using B-bit (e.g., 32-bit) arithmetic. This allows a spatial SVC encoder/decoder to flexibly accommodate different image sizes without having to convert to different arithmetic (e.g., 16-bit or 64-bit arithmetic) for calculations. With the flexible precision B-bit (e.g., 32-bit) arithmetic, an encoder/decoder can devote a flexible number of bits to the fractional component. This allows increased precision for calculations as the number of required bits for representing the integer component decreases (e.g., for a smaller frame size). As the number of required bits for representing the integer component increases (e.g., for a larger frame size), the encoder/decoder can use more bits for the integer component and less bits for the fractional component, reducing precision but maintaining the B-bit arithmetic. In this way, changing between different precisions and different frame sizes is greatly simplified.

This section includes specific details for an example implementation. However, it should be noted that the specifics described herein can be varied in other implementations according to principles described herein.

A. Introduction and Position Calculation Principles

Techniques for computing position and phase information, resulting in much lower computational requirements without any significant loss of accuracy, are described. For example, described techniques can reduce computational requirements significantly—e.g., by reducing nominal dynamic range requirements dramatically (by tens of bits). Considering the variety of possible chroma positions that may be used in base and enhancement layers, it is desirable to find a solution providing proper positioning of resampled chroma samples relative to luma samples. Accordingly, described techniques allow adjustments to be made to calculate positions for video formats with different relationships between luma and chroma positions.

A previous upsampling method designed for extended spatial scalability uses a rather cumbersome method of calculating the position and phase information when upsampling the low-resolution layer; it scales an up-shifted approximate inverse of a denominator, which causes amplification of the rounding error in the inversion approximation as the numerator increases (i.e., as the upsampling process moves from left to right, or from top to bottom). By comparison, techniques described herein have excellent accuracy and simplify computation. In particular, techniques are described that reduce the dynamic range and the amount of right-shifting in the position calculations by tens of bits.

For example, a technique is described for computing the positioning information for obtaining an integer position and a phase positioning variable i, where i=0 ... $2^F-1$, for use in SVC spatial upsampling.

Described techniques apply the resampling process to the application of spatial scalable video coding rather than to forward reference picture resampling. In this application of spatial scalable video coding, certain simplifications can apply. Rather than a general warping process, we only need a picture resizing operation. This can be a separable design for each dimension.

B. Position Calculation Design

Consider a problem statement, in each dimension (x or y), as the production of a string of samples lying conceptually in a real-valued range from L to R>L in the new (upsampled) array. This real-valued range is to correspond to a range from L' to R'>L' in the referenced lower-resolution array.

For a position T in the new array where L≦T≦R, we then need to compute the position in the reference array that corresponds to the position in the new array. This would be the position T'=L'+(T−L)*(R'−L')÷(R−L).

Now instead of considering the resizing of the range from L to R, we define an integer M>0 and consider resizing the range from L to L+$2^M$ by the same resizing ratio (R'−L')÷(R−L). The corresponding range in the referenced sample coordinates are then from L' to R", where R"=L'+$2^M$*(R'−L')÷(R−L). If M is sufficiently large, i.e., if M≧Ceil($\log_2$(R−L)), then R"≧R'. (Let us assume for now that this constraint holds in order to explain the concepts below, although this constraint is not really necessary for proper functioning of the equations.)

Now we can use linear interpolation between the positions L' and R" for the positioning calculations. Position L is mapped to position L', and position T≧L is mapped to position $((2^M-(T-L))*L'+(T-L)*R")\div 2^M$. This converts the denominator of the operation to a power of 2, thus reducing the computational complexity of the division operation by allowing it to be replaced by a binary right shift.

Appropriate modifications can be made to integerize the computations. We round the values of L' and R" to integer multiples of $1\div 2^G$, where G is an integer, such that L' is approximated by $k\div 2^G$ and R" is approximated by $r\div 2^G$ where k and r are integers. Using this adjustment, we have position T mapped to position $((2^M-(T-L))*k+(T-L)*r)\div 2^{(M+G)}$.

Now we assume that the relevant values of T and L are integer multiples of $1\div 2^J$, where J is an integer, such that T−L=$j\div 2^J$. Using this adjustment, we have position T mapped to position $((2^{(M+J)}-j)*k+j*r)\div 2^{(M+G+J)}$, Recall from section IV, above, that the fractional phase of the resampling filter is to be an integer in units of $1\div 2^F$. So the computed position, in these units, is Round$(((2^{(M+J)}-j)*k+j*r)\div 2^{(M+G+J-F)})$, or $t'=((2^{(M+J)}-j)*k+j*r+2^{(M+G+J-F-1)})>>(M+G+J-F)$     (16), or, more simply, $t'=(j*C+D)>>S$     (17), where $S=M+G+J-F$     (18), $C=r-k$     (19), $D=(k<<(M+J))+(1<<(S-1))$     (20).

The only error produced in the method described here (assuming no error in the representation of L and R and L' and R') prior to the rounding of the computed position to the nearest multiple of $1\div 2^F$ (which is an error that is present in both designs) is the rounding error from the rounding of the position R" to the nearest multiple of $1\div 2^G$. This amount is very small if G+M is relatively large. In fact, this source of error is tightly bounded to a magnitude of about $(T-L)\div 2^{(G+M+1)}$, the word length requirements for computation of the results are modest, and the modulo arithmetic allows the integer part of the result to be separated out to minimize word length, or allows the computation to be decomposed in other similar ways as well.

F can, for example, be 4 or greater. (For some applications, F=3 or F=2 may suffice.) Example values of J include J=1 for luma position calculations and J=2 for chroma sample positions. Rationale for these example values of J can be found below.

1. First Example Simplified Position Calculation Technique Using Signed B-Bit Arithmetic If R'>0 and L'>−R', then all positions t' to be computed in the picture to be upsampled, as an integer in units of $1\div 2^F$, will lie between $-2^Z$ and $2^Z-1$, where Z=Ceil(Log 2(R'))+F. If the word length of the (j*C+D) computation is B bits, and we assume the use of signed two's complement arithmetic, then we can require that B−1≧Z+S. High accuracy is achieved if this constraint is tight, i.e., if B−1=Z+M+G+J−F.

For reasonably-small picture sizes (e.g., for levels up to level 4.2 in the current H.264/MPEG-4 AVC standard), B=32 can be used as a word length. Other values of B also can be used. For very large pictures, a larger B may be used. The computations can also be easily decomposed into smaller word length sub-computations for use on 16-bit or other processors.

The remaining two degrees of freedom are M and G. Their relationship is flexible, as long as G is sufficiently large to avoid any need for rounding error when representing L' as $k \div 2^G$. Thus, based on issues discussed in the next section for SVC, we can just pick G=2, yielding $$M=B+F-(G+J+Z+1)$$

i.e., $$M=32+4-(2+1+Z+1)$$

i.e., $$M=32-Z.$$

For example, if we want to upsample the luma array of a picture that has a width of 1000 luma samples with B=32 and L'=0, we can use F=4, G=2, J=1, M=18, S=17, and Z=14 using this first example position calculation technique.

When T is very close (or equal) to R and K is very close (or equal) to an integer power of 2, especially when $(T-L)*(R'-L') \div 2^F$ is large (e.g., greater than ½), it may be hypothetically possible for the upper bound to be violated by 1. We do not further consider such cases here, although adjustments to handle such cases are straightforward.

2. Second Example Position Calculation Technique Using Unsigned B-Bit Arithmetic If all positions to be calculated in the low-resolution picture are greater than or equal to 0, which is something that can be made true by adding an appropriate offset to the origin of the coordinate system, then it may be a better choice to compute t'=(j*C+D) using unsigned integer arithmetic rather than signed two's complement arithmetic. This allows one more bit of dynamic range without overflow in the computations (i.e., we can use B bits of dynamic range magnitude rather than B−1 bits), thus increasing M (or G) and S each by 1 and further increasing the accuracy of the computed results. Thus, after including an offset E to adjust the origin of the coordinate system, the form of the computation would be t'=((j*C+D')>>S')+E rather than just t'=(j*C+D)>>S.

We provide further detail on this more accurate method involving unsigned arithmetic by identifying when the origin offset E would not be needed as follows.

Choose values for B, F, G, J, and Z as described above.
Set M=B+F−(G+J+Z).
Compute 5, C, and D as specified above in Equations (18), (19) and (20), respectively, where D is computed as a signed number.
If D is greater than or equal to zero, no origin offset (i.e., no use of E) is needed and the computation can be performed simply as t'=(j*C+D)>>S using unsigned arithmetic and the result will have greater accuracy than the first example position calculation technique described in section V.B.1 above.

In addition to enhancing accuracy by enabling computation using unsigned integers, offsetting the origin can sometimes also be used to provide improved accuracy by enabling a decrease in the value of Z. Without the origin offset, Z is a function of R'. But with the origin offset, we can make Z a function of R'−L', which will make the computation more accurate if this results in a smaller value of Z.

We provide further detail on this more accurate method involving unsigned arithmetic by showing one way to offset the origin, deriving D' and E as follows.

Choose values for B, F, G, and J, as described above.
Set Z=Ceil(Log 2(R'−L'))+F.
Set M=B+F−(G+J+Z).
Compute S, C, and D as specified above in Equations (18), (19) and (20), respectively, where D is computed as a signed number.
Set E=D>>S.
Set D'=D−(E<<S).
The position computation can then be performed as t'=((j*C+D')>>S)+E.

If D' and E (and M, S, and Z) are computed in this manner, the mathematical result of the equation t'=((j*C+D')>>S)+E will actually always be theoretically the same as the result of the equation t'=(j*C+D)>>S, except that the value of (j*C+D) may sometimes fall outside of the range of values from 0 to $2^B-1$, while the value of (j*C+D') will not.

For example, if we want to upsample the luma array of a picture that has a width of 1000 luma samples with B=32 and L'=0, we can use F=4, G=2, J=1, M=19, S=18, and Z=14 using this second example position calculation technique. Another possibility that would work equally well, rather than offsetting the origin so that all values of j*C+D' are non-negative and thus allowing use of the B-bit computing range from 0 to $2^B-1$ using unsigned arithmetic, would be to offset the origin further to the right by another $2^{(B-1)}$ to allow use of the B-bit computing range from $-2^{(B-1)}$ to $2^{(B-1)}-1$ using signed arithmetic.

As in the first example position calculation technique in the previous section, there could be "corner case" adjustments needed when T is very close (or equal) to R and R'−L' is very close (or equal) to an integer power of 2.

3. Example Multi-Stage Techniques for Position Calculation

We have discussed methods in which the design was made to be able to perform the computation using the same equation, e.g., t'=((j*C+D')>>S)+E, with the same variable values C, D', S, and E for all values of j covering the range of samples to be generated (i.e., for all values of T between L and R). We now discuss how this assumption can be relaxed, enabling greater accuracy and/or reduced computational dynamic range requirements.

Ordinarily, the resampling process proceeds from left to right (or top to bottom) to generate a string of consecutive samples at equally-spaced positions. In the second example position technique described in section V.B.2 above, we Showed how changing the origin using the offset parameter E can be used to make good use of the B-bit dynamic range of the register used to compute the (j*C+D') part of the position computation.

Recall that in the previous section, only the S least significant bits of D were retained in D', and the rest was moved into E. Thus the major remaining issue for computation of (j*C+D') is the magnitude of j*C.

Recall that T and L are integer multiples of $1 \div 2^J$. Ordinarily we perform the upsampling process to generate a string of samples at integer-valued increments in the higher-resolution picture, e.g., with a spacing of $2^J$ between consecutively-generated samples. Thus we desire to compute the positions $t'_i$ that correspond to the positions $T_i=(p+i*2^J)\div 2^J$ for i=0 to N−1 for some value of p and N.

This process can be summarized in pseudo-code as shown in the pseudo-code 1200 of FIG. 12 for some value of p and N.

As i increases toward N, the value of q increases, and the maximum value of q should be kept within the available dynamic range of B bits. The maximum value computed for q is $(p+(N-1)*2^J)*C+D'$.

Now, instead of generating all samples in one loop in this fashion, consider breaking up the process into multiple stages, e.g., two stages. For example, in a two stage process, the first stage generates the first $N_0<N$ samples, and the second stage generates the remaining $N-N_0$ samples. Also, since p is a constant with respect to the loop, we can move its impact into D' and E before the first stage. This results in a two-stage process illustrated in pseudo-code 1300 in FIG. 13.

At the beginning of each stage in pseudo-code 1300, the origin has been reset such that all but the S least significant bits of the first value of q for the stage have been moved into E (i.e., into $E_0$ for the first stage and $E_1$ for the second stage). Thus, during operation of the each of the two stages, q requires a smaller dynamic range. After breaking the process into stages in this fashion, the maximum value of q will be $N_0*C'+D_0$, or $((N-N_0-1)*C'+D_1$, whichever is larger. But since $D_0$ and $D_1$ each have no more than S bits of unsigned dynamic range, this will ordinarily be a smaller maximum value than in the previously-described single-stage design. The number of samples generated in the stage (i.e., $N_0$ for the first stage and $N-N_0$ for the second stage) can affect the dynamic range for the associated computations. For example, using a smaller number of samples in each stage will result in a smaller dynamic range for the associated computations.

Each stage can be split further into more stages, and thus the generation of the N total samples can be further decomposed into any number of such smaller stages. For example, the process could be broken up into stages of equal size so that blocks of, e.g., 8 or 16 consecutive samples are generated in each stage. This technique can either be used to reduce the necessary number of bits of dynamic range B for computing q or to increase the precision of the computation (increasing S and G+M) while keeping the dynamic range the same, or a mixture of these two benefits.

This technique of decomposing the position calculation process into stages can also be used to perform a continuous resampling process along a very long string of input samples (conceptually, the string could be infinitely long), such as when performing sampling rate conversion as samples arrive from an analog-to-digital converter for an audio signal. Clearly, without breaking up the process into finite-size stages and resetting the origin incrementally from each stage to the next, an infinitely-long string of samples could not be processed by the techniques described in the previous sections, since this would require an infinite dynamic range in the processing word length. However, the difficulty in applying the techniques to effectively-infinite string lengths is not a substantial limitation on such techniques since the application to effectively-infinite length would only be useful when no rounding error is entailed by the representation of the hypothetical benchmark positions L' and R'' in integer units representing multiples of $1 \div 2^G$.

Under the circumstances in which multi-stage position calculation techniques can be applied, they provide a way for the computations to be performed along an infinite-length string of samples with no "drifting" accumulation of rounding error whatsoever in the operation of the position calculations throughout the entire rate conversion process.

4. Example Incremental Operation of Position Calculation

An interesting special case for the multi-stage decomposition concept described above is when the number of samples to be produced in each stage has been reduced all the way to just one sample per stage. The pseudo-code 1400 in FIG. 14 represents a process for generating N positions $t'_i$ for i=0 to N−1.

Since the process is described as an upsampling process (although the same principles could also apply to a downsampling process), we know that for each increment of i there is a spacing of 1 in the higher-resolution picture and therefore there is an increment of less than or equal to 1 in the lower-resolution picture. An increment of 1 in the spatial position in the lower-resolution picture corresponds to a value of $2^{(S+F)}$ for C'. Also, we know that $D'<2^S$. Therefore $q=C'+D'$ has a range from 0 to less than $2^{(S+F)}+2^S$ and therefore q can be computed with a dynamic range requirement of no more than B=S+F+1 bits using unsigned integer arithmetic. In one implementation, this dynamic range requirement is invariant to picture size (i.e., it does not depend on the value of R' or R'−L').

For scalable video coding and many other such applications, there may be no real need to support upsampling ratios that are very close to 1. In such applications, we can assume that C' actually requires no more than S+F bits.

For example, if we want to upsample the luma array of a picture that has a width of 1000 luma samples with B=32 and L'=0, we can use F=4, G=2, J=1, M=29, S=28, and Z=14 using this method. The result would be so extraordinarily precise as to make a smaller value of B seem like a more reasonable choice.

Alternatively, if we want to upsample the luma array of a picture that has a width of 1000 luma samples with B=16 and L'=0, we can use F=4, G=2, J=1, M=13, S=12, Z=14 using this method.

Further knowledge of the circumstances of the upsampling operation to be performed may provide further optimization opportunities. For example, if the upsampling ratio is significantly greater than two, the dynamic range requirement will be reduced by another bit, and so on for upsampling ratios greater than four, sixteen, etc.

None of the changes (relative to the example multi-stage position calculation technique discussed above) described with reference to the example incremental position calculation technique in this section affect the actual computed values of the positions $t'_i$ for given values of C, D and S. Only the dynamic range necessary to support the computation is changed.

The inner loop in pseudo-code 1400 for this form of decomposition does not require any multiplication operations. This fact may be beneficial to providing reduced computation time on some computing processors.

5. Additional Remarks

For common resampling ratios such as 2:1, 3:2, etc.—any case in which no rounding would be necessary for approximating the positions L' and R'' as an integer in units of $1 \div 2^G$—there is no rounding error at all when using these methods (other than whatever rounding error may be induced when rounding the final result to an integer in units of $1 \div 2^F$, which is an error that would be present regardless of the position computation method).

C. Luma and Chroma Positions and Relationships

Assuming exact alignment of the complete new (upsampled) picture and the reference picture arrays, relative to the luma sampling grid index coordinates, the positions L and R in the current picture coordinates are L=−½ and R=W−½, where W is the number of samples in the image vertically or horizontally, depending on the relevant resampling dimension. Equivalently, we could set the origin of the image spatial coordinate system a half-sample to the left of (or above) the position of grid index 0 and add ½ when converting from image spatial coordinates to grid index values, thus avoiding the need to deal with negative numbers when performing computations in the spatial coordinate system.

The positions L' and R' in the referenced (lower-resolution) picture are referenced to the sampling grid coordinates in the same way, where in this case W is the number of samples in the referenced picture rather than in the new picture.

For the chroma sampling grid (whether in the new picture or the referenced picture), the situation is somewhat less straightforward. To construct the designated alignment of chroma samples relative to luma, consider the image rectangle that is represented by the chroma samples to be the same as the rectangle that is represented by the luma samples. This produces the following cases:

Horizontally, for 4:2:0 chroma sampling types 0, 2, and 4 (see FIG. 5D), the current picture coordinates are defined by L=−¼ and R=W−¼.

Horizontally, for 4:2:0 chroma sampling types 3, 1, and 5 (see FIG. 5D), the current picture coordinates are defined by L=−½ and R=W−½.

Vertically, for 4:2:0 chroma sampling types 2 and 3 (see FIG. 5D), the current picture coordinates are defined by L=−¼ and R=W−¼.

Vertically, for 4:2:0 chroma sampling types 0 and 1 (see FIG. 5D), the current picture coordinates are defined by L−½ and R=W−½.

Vertically, for 4:2:0 chroma sampling types 4 and 5 (see FIG. 5D), the current picture coordinates are defined by L=−¾ and R=W−¾.

Horizontally, for 4:2:2 chroma sampling, the current picture coordinates for the 4:2:2 sampling typically used in industry practice are defined by L=−¼ and R=W−¼.

Vertically, for 4:2:2 chroma sampling, the current picture coordinates for the 4:2:2 sampling typically used in industry practice are defined by L=−½ and R=W−½.

Both horizontally and vertically, for 4:4:4 chroma sampling, the current picture coordinates are defined by L=−½ and R=W−½.

Again an offset can be used to place the origin of the coordinate system sufficiently to the left of position L and avoid the need to work with negative numbers.

The integer coordinates and the fractional phase offset remainder are computed by adjusting the integer coordinate positions of the samples to be produced in the upsampled array to compensate for the fractional offset L, and then applying the transformation shown at the end of section V.B. Conceptually, shifting the result to the right by F bits results in the integer coordinate pointer into the reference picture, and subtracting the left-shifted integer coordinate (shifted by F bits) provides the phase offset remainder.

D. Extra Precision for Position Calculation for Upsampling

This section describes how to map the position calculation method of section V.C.4 above to a specific upsampling process, such as an upsampling process that may be used for the H.264 SVC Extension. The position calculation is applied in a very flexible way to maximize the precision for both luma and chroma channels at various chroma formats as well as for both progressive and interlace frame formats. The techniques described in this section can be varied depending on implementation and for different upsampling processes.

In the above-described position calculations (in above sections V.A-C), the rescaling parameter (which is the variable C, and hereafter labeled deltaX (or deltaY) in the following equations) is scaled up by a scaling factor equal to $2^J$ (where J=1 for luma and 2 for chroma) to form the increment added for generating each sample position from left to right or top to bottom. The scaling was selected such that the up-scaled increment will fit into 16 bits.

1. Maximum Precision for Scaling Position Computation

A direct way to apply the position calculation method is to scale up the rescaling parameter by a scaling factor equal to $2^J$, where J=1 for luma and 2 for chroma, to form the increment added for generating each sample position from left to right or top to bottom. The scaling parameters are then selected to ensure that the up-scaled increment will fit into a specific word length such as 16 bits. A more flexible design is described in the following sections to maximize the position precisions.

a. Luma Channel

The "direct" luma position calculation method can be summarized with the following example equations for F=4 and S=12 (along the horizontal direction):

deltaX=Floor(((BasePicWidth<<15)+(ScaledBase-
   Width>>1))÷ScaledBaseWidth)

xf=((2*(xP−ScaledBaseLeftOffset)+1)*deltaX−30720)
   >>12

Here, BasePicWidth is the horizontal resolution of the base-layer or low-resolution picture; ScaledBaseWidth is the horizontal resolution of the high-resolution picture region or window; deltaX is the intermediate rescaling parameter, which in this case is a rounded approximation of 32768 times the inverse of the upsampling ratio; xP represents the sample position in the high-resolution picture; ScaledBaseLeftOffset represents the relative position of the picture window in the high-resolution picture, and Floor( ) denotes the largest integer less than or equal to its argument. The constant value 30720 results from adding $2^{S-1}$ as the rounding offset prior to the right shift and subtracting $2^S * 2^F/2$ for the half-sample offset of the luma sampling grid reference location as discussed at the beginning of section V.C above.

It is noteworthy that each increment of xP results in an increment of 2*deltaX inside the equations. And, the LSB of the quantity 2*deltaX is always zero, so one bit of computational precision is essentially being wasted. Approximately one extra bit of precision can be obtained, without any significant increase in complexity, by changing these equations to:

deltaX=Floor(((BasePicWidth<<16)+(ScaledBase-
   Width>>1))÷ScaledBaseWidth)

xf=((xP−ScaledBaseLeftOffset)*deltaX+
   (deltaX>>1)−30720)>>12 or a (slightly) more accurate form as follows:

deltaXa=Floor(((BasePicWidth<<16)+(ScaledBase-
   Width>>1))÷ScaledBaseWidth)

deltaXb=Floor(((BasePicWidth<<15)+(ScaledBase-
   Width>>1))÷ScaledBaseWidth)

xf=((xP−ScaledBaseLeftOffset)*deltaXa+deltaXb−
   30720)>>12

The latter of these two forms is suggested due to its higher accuracy and negligible complexity impact (although the precision difference also seems very small).

Note that on processing architectures on which division calculations are difficult to perform, having the result of one of these equations can simplify the computation of the other. The value of deltaXa will always be in the range of 2*deltaXa plus or minus 1. The following simplified rule can therefore be derived to avoid the need to perform a division operation for the computation of deltaXa:

deltaXa=(deltaXb<<1)

remainderDiff=(BasePicWidth<<16)+(ScaledBaseWidth>>1)−deltaXa if (remainderDiff<0)

deltaXa−− else if (remainderDiff≧ScaledBaseWidth)

deltaXa++ b. Chroma Channels

A factor-of-four multiplier can be used for chroma channels instead of a factor-of-two multiplier in this part of the design to enable representation of the chroma positions for 4:2:0 sampling (using J=2 for chroma rather than J=1 as described for luma). Therefore the "direct" equations are:

deltaXC=Floor(((BasePicWidthC<<14)+(ScaledBaseWidthC>>1))÷ScaledBaseWidthC)

xfC=((((4*(xC−ScaledBaseLeftOffsetC)+(2+scaledBaseChromaPhaseX))*deltaXC)+2048)>>12)−4*(2+baseChromaPhaseX)

Here, baseChromaPhaseX and scaledBaseChromaPhaseX represent chroma sampling grid position offsets for the low- and high-resolution pictures, respectively. The values of these parameters may be explicitly conveyed as information sent from the encoder to the decoder, or may have specific values determined by the application. All other variables are similar to that defined for the luma channel with additional "C" suffix to represent application to the chroma channel.

Each increment of xC results in an increment of 4*deltaXC inside the equation. Therefore, approximately two extra bits of precision can be obtained, without any substantial increase in complexity, by changing these equations to:

deltaXC=Floor(((BasePicWidthC<<16)+(ScaledBaseWidthC>>1))÷ScaledBaseWidthC)

xfC=(((xC−ScaledBaseLeftOffsetC)*deltaXC+(2+scaledBaseChromaPhaseX)*((deltaXC+K)>>2)+2048)>>12)−4*(2+baseChromaPhaseX)

where K=0, 1, or 2. Using K=0 would avoid an extra operation. Using K=1 or K=2 would have a little higher accuracy.

The corresponding, slightly more accurate form would be the following:

deltaXCa=Floor(((BasePicWidthC<<16)+(ScaledBaseWidthC>>1))÷ScaledBaseWidthC)

deltaXCb=Floor(((BasePicWidthC<<14)+(ScaledBaseWidthC>>1))÷ScaledBaseWidthC)

xfC=(((xC−ScaledBaseLeftOffsetC)*deltaXCa+(2+scaledBaseChromaPhaseX)*deltaXCb+2048)>>12)−4*(2+baseChromaPhaseX)

As with the luma case, the latter variant is preferred since the complexity difference seems negligible (although the precision difference also seems very small).

c. Interlaced Field Coordinates

The reference for the coordinate system of a picture is ordinarily based on half-sample positions in luma frame coordinates, thus resulting in the scale factor of two for luma coordinate reference positions as described above. A half-sample shift in luma frame coordinates corresponds to a quarter-sample shift in 4:2:0 chroma frame coordinates, which is why we currently use a factor of four rather than a factor of two in the scaling for the chroma coordinates as described above.

Horizontally there is no substantial difference in operations for coded pictures that represent a frame and those that represent a single field of interlaced video. However, when a coded picture represents a single field, a half-sample position shift in luma frame vertical coordinates corresponds to a quarter-sample position shift in luma field vertical coordinates. Thus, a scale factor of four rather than two should be applied in the calculation of the vertical luma coordinate positions.

Similarly, when a coded picture represents a single field, a half-sample position shift in luma frame vertical coordinates corresponds to a one-eighth-sample position shift in the chroma field vertical coordinates. Thus, a scale factor of eight rather than four should be applied in the calculation of the vertical chroma coordinate positions.

These scaling factors for computation of vertical coordinate positions in coded field pictures can be incorporated into a deltaY vertical increment computation in the same manner as described above for the increment computation in coded frame pictures. In this case, due to the increased scaling factor that is applied, the precision improvement becomes approximately two bits of added precision for luma positions and three bits of added precision for chroma (vertically).

2. 4:2:2 and 4:4:4 Chroma Restriction and Refinement

The position calculation method of section V.D.1.b requires use of a different multiplication factor for chroma than for luma. This makes sense for 4:2:0 video and it is also reasonable for 4:2:2 video horizontally, but it is not necessary for 4:2:2 video vertically or for 4:4:4 video either horizontally or vertically, since in those cases the luma and chroma resolution is the same and the luma and chroma samples are therefore presumably co-located.

As a result, the method of section V.D.1.b might require separate computations for determining luma and chroma positions even when the luma and chroma resolution is the same in some dimension and no phase shift is intended, just because the rounding will be performed slightly differently in the two cases. This is undesirable, so a different handling of chroma is suggested in this section for use with 4:2:2 and 4:4:4 sampling structures.

a. 4:2:2 Vertical and 4:4:4 Horizontal and Vertical Positions

For the vertical dimension of 4:2:2 video and for both vertical and horizontal dimensions of 4:4:4 video, there is no apparent need for the custom control of chroma phase. Therefore, whenever the chroma resolution is the same as the luma resolution in some dimension, the equations for the computation of chroma positions should be modified to result in computing the exact same positions for both luma and chroma samples whenever the chroma sampling format has the same resolution for luma and chroma in a particular dimension. One option is just to set the chroma position variables equal to the luma position variables, and another is to set up the chroma position equations so that they have the same result.

b. 4:2:2 Horizontal Positions

While there is no functional problem with allowing chroma phase adjustment horizontally for 4:2:2 video, if there is only one type of horizontal subsampling structure that is in use for 4:2:2, such as one that corresponds to the value −1 for scaledBaseChromaPhaseX or BaseChromaPhaseX in the equations of section V.D.1.b, it may be desirable to consider forcing these values to be used whenever the color sampling format is 4:2:2.

VI. Extensions and Alternatives

Techniques and tools described herein also can be applied to multi-resolution video coding using reference picture resampling as found, for example in Annex P of the ITU-T international standard Recommendation H.263.

Techniques and tools described herein also can be applied not only to the upsampling of picture sample arrays, but also to the upsampling of residual data signals or other signals. For example, techniques and tools described herein also can be applied to the upsampling of residual data signals for reduced resolution update coding as found, for example in Annex Q of the ITU-T international standard Recommendation H.263. As another example, techniques and tools described herein can also be applied to the upsampling of residual data signals for prediction of high-resolution residual signals from lower-resolution residual signals in a design for spatial scalable video coding. As a further example, techniques and tools described herein can also be applied to the upsampling of motion vector fields in a design for spatial scalable video coding. As a further example, techniques and tools described herein can also be applied to upsampling of graphics images, photographic still pictures, audio sample signals, etc.

Having described and illustrated the principles of my invention with reference to various described embodiments, it will be recognized that the described embodiments can be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of my invention may be applied, I claim as my invention all such embodiments as may come within the scope and spirit of the following claims and equivalents thereto.

I claim:

1. A method of performing upsampling of base layer image data with a computing device that implements an image or video encoder or decoder, wherein the computing device includes a processor and memory, the method comprising, for a position in an upsampled array:
    with the computing device, computing a position in the base layer image data, wherein y indicates a vertical value for the position in the base layer image data, wherein derivation of y includes computation that is mathematically equivalent in result to (j*C+D)>>S, and wherein:
        j indicates a vertical value for the position in the upsampled array;
        C approximates $2^{S+F}$ multiplied by an inverse of a vertical scale factor;
        D is an offset;
        S is a shift value; and
        F is based on a number of bits in a fractional component of y.

2. The method of claim 1 wherein j, C, and D depend in part on whether the base layer image data is for a frame or field, and wherein j and D depend in part on whether the base layer image data is for luma or chroma.

3. The method of claim 1 wherein:
    S sets dynamic range and precision; and
    D depends on vertical resolution for the base layer image data, the vertical scale factor and S.

4. The method of claim 1 wherein F is 4 and S is 12.

5. The method of claim 1 wherein x indicates a horizontal value for the position in the base layer image data, wherein derivation of x includes computation that is mathematically equivalent in result to (i*C'+D')>>S', and wherein:
    i indicates a horizontal value for the position in the upsampled array;
    C' approximates $2^{S'+F'}$ multiplied by an inverse of a horizontal scale factor;
    D' is an offset that can be the same or different as D;
    S' is a shift value that can be the same or different as S; and
    F' is based on a number of bits in a fractional component of x.

6. The method of claim 5 wherein i is based on T–L, T indicating a horizontal offset and L indicating a left offset.

7. The method of claim 5 wherein F' is 4 and S' is 12.

8. The method of claim 5 wherein C' is derived according to:

$$((\text{BasePicWidth}<<16)+(\text{ScaledBaseWidth}>>1))\div\text{ScaledBaseWidth},$$

where BasePicWidth indicates horizontal resolution for the base layer image data and ScaledBaseWidth indicates horizontal resolution after the upsampling.

9. The method of claim 5 wherein x further depends on an offset E, the derivation of x including computation that is mathematically equivalent in result to ((i*C'+D')>>S')+E.

10. The method of claim 5 further comprising:
    selecting a vertical filter based on F least significant bits of y and selecting vertical integer positions to be filtered based on remaining bits of y, wherein vertical interpolation of the base layer image data uses the vertical filter at the vertical integer positions; and
    selecting a horizontal filter based on F' least significant bits of x and selecting horizontal integer positions to be filtered based on remaining bits of x, wherein horizontal interpolation of results of the vertical interpolation uses the horizontal filter at the horizontal integer positions.

11. The method of claim 1 further comprising:
    interpolating a value at the position in the base layer image data; and
    assigning the interpolated value to the position in the upsampled array.

12. The method of claim 1 wherein the base layer image data is sample values or residual data values, the method further comprising:
    receiving encoded data in a bitstream over a wireless communication connection;
    decoding the encoded data to reconstruct video pictures, including decoding the base layer image data, performing the upsampling, and decoding an enhancement layer; and
    outputting the reconstructed video pictures on the display.

13. The method of claim 1 further comprising, during encoding:
    accepting full-resolution video;
    setting resolution for a base layer;
    downsampling the full-resolution video to the resolution for the base layer;
    encoding the downsampled video for the base layer;
    setting resolution for an enhancement layer;
    performing the upsampling as part of encoding for the enhancement layer; and outputting a layered bitstream including encoded data for the base layer and encoded data for the enhancement layer.

14. The method of claim 13 wherein the resolution for the enhancement layer is resolution of the full-resolution video.

15. The method of claim 13 wherein the upsampling supports an arbitrary resampling ratio.

16. The method of claim 13 wherein the upsampling is constrained to a resampling ratio of 2:1 or 3:2.

17. A system comprising a processor, memory and computer-readable storage that stores computer-executable instructions for causing the system to perform a method of upsampling, wherein the method comprises, for a position in an upsampled array:
    computing a position in base layer image data, wherein y indicates a vertical value for the position in the base layer image data, wherein derivation of y includes computation that is mathematically equivalent in result to (j*C+D)>>S, and wherein:
        j indicates a vertical value for the position in the upsampled array;
        C approximates $2^{S+F}$ multiplied by an inverse of a vertical scale factor;
        D is an offset;
        S is a shift value; and
        F is based on a number of bits in a fractional component of y.

18. The system of claim 17 wherein:
    j, C, and D depend in part on whether the base layer image data is for a frame or field;
    j and D depend in part on whether the base layer image data is for luma or chroma;
    D depends on vertical resolution for the base layer image data, the vertical scale factor and S;
    F is 4; and
    S is 12.

19. The system of claim 17 wherein x indicates a horizontal value for the position in the base layer image data, wherein derivation of x includes computation that is mathematically equivalent in result to (i*C'+D')>>S', and wherein:
    i indicates a horizontal value for the position in the upsampled array;
    C' approximates $2^{S'+F'}$ multiplied by an inverse of a horizontal scale factor;
    D' is an offset that can be the same or different as D;
    S' is a shift value that can be the same or different as S; and
    F' is based on a number of bits in a fractional component of x.

20. The system of claim 19 wherein:
    i is based on T−L, T indicating a horizontal offset and L indicating a left offset;
    F' is 4;
    S' is 12; and
    C' is derived according to:

((BasePicWidth<<16)+(ScaledBaseWidth>>1))
        ÷ScaledBaseWidth, where BasePicWidth indicates horizontal resolution for the base layer image data and ScaledBaseWidth indicates horizontal resolution after the upsampling.

21. The system of claim 19 wherein the method further comprises:
    selecting a vertical filter based on F least significant bits of y and selecting vertical integer positions to be filtered based on remaining bits of y, wherein vertical interpolation of the base layer image data uses the vertical filter at the vertical integer positions; and
    selecting a horizontal filter based on F' least significant bits of x and selecting horizontal integer positions to be filtered based on remaining bits of x, wherein horizontal interpolation of results of the vertical interpolation uses the horizontal filter at the horizontal integer positions.

22. The system of claim 21 wherein the computer-readable storage further stores computer-executable instructions for encoding an enhancement layer using interpolated sample values at positions in the upsampled array.

23. The system of claim 21 wherein the computer-readable storage further stores computer-executable instructions for decoding an enhancement layer using interpolated sample values at positions in the upsampled array.

24. The system of claim 17 wherein the method further comprises, during encoding:
    accepting full-resolution video;
    setting resolution for a base layer;
    downsampling the full-resolution video to the resolution for the base layer;
    encoding the downsampled video for the base layer;
    setting resolution for an enhancement layer;
    performing the upsampling as part of encoding for the enhancement layer; and
    outputting a layered bitstream including encoded data for the base layer and encoded data for the enhancement layer.

25. The system of claim 24 wherein the resolution for the enhancement layer is resolution of the full-resolution video.

26. The system of claim 24 wherein the upsampling supports an arbitrary resampling ratio.

27. The system of claim 24 wherein the upsampling is constrained to a resampling ratio of 2:1 or 3:2.

28. A system comprising a processor, memory, a wireless communication connection, a display, and computer-readable storage that stores computer-executable instructions for causing the system to perform a method comprising:
    receiving encoded data in a bitstream over the wireless communication connection;
    decoding the encoded data to reconstruct video pictures, including:
        decoding base layer image data;
        upsampling the base layer image data, including for a position in an upsampled array:
            computing a vertical value y for a position in the base layer image data, wherein derivation of y includes computation that is mathematically equivalent in result to (j*C+D)>>S, and wherein j indicates a vertical value for the position in the upsampled array, C approximates $2^{S+F}$ multiplied by an inverse of a vertical scale factor, D is an offset, S is a shift value, and F is based on a number of bits in a fractional component of y;
            computing a horizontal value x for the position in the base layer image data, wherein derivation of x includes computation that is mathematically equivalent in result to (i*C'+D')>>S', and wherein i indicates a horizontal value for the position in the upsampled array, C' approximates $2^{S'+F'}$ multiplied by an inverse of a horizontal scale factor, D' is an offset that can be the same or different as D, S' is a shift value that can be the same or different as S, and F' is based on a number of bits in a fractional component of x;
            selecting a vertical filter based on F least significant bits of y and selecting vertical integer positions to be filtered based on remaining bits of y, wherein vertical interpolation of the base layer image data uses the vertical filter at the vertical integer positions; and selecting a horizontal filter based on F' least significant bits of x and selecting horizontal integer positions to be filtered based on remaining bits of x, wherein horizontal interpolation of results of the vertical interpolation uses the horizontal filter at the horizontal integer positions; and decoding an enhancement layer; and outputting the reconstructed video pictures on the display.

29. Computer-readable memory storing computer-executable instructions for causing a computing device programmed thereby to perform a method of upsampling of base layer image data during image or video encoding or decoding, the computer-readable memory comprising one or more of volatile memory, non-volatile memory, magnetic storage media or optical storage media, the method comprising, for a position in an upsampled array:

computing a position in the base layer image data, wherein y indicates a vertical value for the position in the base layer image data, wherein derivation of y includes computation that is mathematically equivalent in result to $(j * C + D) >> S$, and wherein:

j indicates a vertical value for the position in the upsampled array;

C approximates $2^{S+F}$ multiplied by an inverse of a vertical scale factor;

D is an offset;

S is a shift value; and

F is based on a number of bits in a fractional component of y.

* * * * *